(12) United States Patent
Gertsch et al.

(10) Patent No.: US 7,479,897 B2
(45) Date of Patent: Jan. 20, 2009

(54) CURVE ROLLOVER WARNING SYSTEM FOR TRUCKS

(75) Inventors: Jamie Gertsch, Tigard, OR (US);
Andrew S. McLandress, Portland, OR (US); Seth Olds Rogers, Palo Alto, CA (US); Stefan Schroedl, Palo Alto, CA (US); Vikas Taliwal, Los Altos Hills, CA (US); Christopher Kenneth Hoover Wilson, Redwood City, CA (US)

(73) Assignee: Daimler AG, Stuttgart (DE)

( * ) Notice: Subject to any disclaimer, the term of this patent is extended or adjusted under 35 U.S.C. 154(b) by 289 days.

(21) Appl. No.: 10/559,614

(22) PCT Filed: Jun. 4, 2004

(86) PCT No.: PCT/US2004/017717

§ 371 (c)(1),
(2), (4) Date: May 19, 2006

(87) PCT Pub. No.: WO2004/110809

PCT Pub. Date: Dec. 23, 2004

(65) Prior Publication Data

US 2007/0008090 A1 Jan. 11, 2007

Related U.S. Application Data

(60) Provisional application No. 60/475,509, filed on Jun. 4, 2003.

(51) Int. Cl.
G08G 1/01 (2006.01)
(52) U.S. Cl. .................. 340/936; 340/438; 701/117; 342/457

(58) Field of Classification Search ............. 340/936, 340/905, 907, 917, 933, 943, 941, 942, 438, 340/440; 701/117, 119, 37, 38, 36, 39; 342/457, 342/357.07, 357.12
See application file for complete search history.

(56) References Cited

U.S. PATENT DOCUMENTS

| | | | | |
|---|---|---|---|---|
| 5,364,205 A | * | 11/1994 | Lemelson | ...................... 404/72 |
| 5,617,086 A | | 4/1997 | Klashinsky et al. | |
| 5,979,581 A | * | 11/1999 | Ravani et al. | ................ 180/168 |
| 6,204,778 B1 | * | 3/2001 | Bergan et al. | ................ 340/936 |
| 6,320,515 B1 | | 11/2001 | Olsson | |
| 6,369,712 B2 | * | 4/2002 | Letkomiller et al. | ...... 340/572.1 |
| 6,377,205 B1 | | 4/2002 | Eckersten et al. | |
| 6,397,133 B1 | * | 5/2002 | van der Pol et al. | ........... 701/37 |

(Continued)

Primary Examiner—Daniel Previl
(74) Attorney, Agent, or Firm—Crowell & Moring LLP

(57) ABSTRACT

In a method for preventing rollover for a vehicle traveling on a road, for each present position of the vehicle as it moves forward, its speed is forecasted for future positions of the vehicle on the road, based on an assumption regarding driving style of the operator, and based on a map containing road geometry data and statistical speed data for vehicles traveling said road. At each such present position of the vehicle, a maximum safe speed is determined for points on the road forward of the vehicle, based on a maximum lateral acceleration, the road geometry and the vehicle parameters. A rollover warning is generated for any current position of the vehicle at which the forecasted future speed for at least one particular point on the road forward of the vehicle exceeds the determined maximum safe speed at particular point.

16 Claims, 32 Drawing Sheets

U.S. PATENT DOCUMENTS 6,510,382 B2 * 1/2003 Wilson ....................... 701/208
6,694,225 B2 * 2/2004 Aga et al. ..................... 701/1
6,982,635 B2 * 1/2006 Obradovich ................ 340/439
6,990,401 B2 * 1/2006 Neiss et al. ................... 701/96

* cited by examiner

CURVE ROLLOVER WARNING SYSTEM FOR TRUCKS

This application is related to U.S. Pat. No. 6,510,382 and U.S. Pat. No. 6,385,539, and claims priority of provisional U.S. patent application Ser. No. 60/475,509, filed Jun. 4, 2003, the disclosure of which is incorporated by reference herein.

The present invention is directed to a curve rollover warning system for a vehicle.

BACKGROUND OF THE INVENTION

Truck rollover is a serious problem in the transportation community. Statistics from National Highway Traffic Safety Administration (NHTSA) show that vehicle rollovers kill 10,000 people yearly in the USA alone, injure another 27,000, and cause tremendous economic damage.

A Rollover Stability Advisor (RSA) developed by Freightliner LLC warns truck drivers to slow down when they are nearing the stability limits of their truck. For this purpose, the system computes truck "Rollover" scores in real time when the truck is running. The score is computed every half second as $$\text{RSA\_score} = \frac{a_N(\text{Actual})}{a_N(\text{Critical})} \times 100 \qquad (\text{Eq. 1})$$

where $a_N$ is the lateral acceleration of the truck.

The "critical" lateral acceleration value in this equation is inversely proportional to the mass of the truck and is determined experimentally with a tilt table. When the RSA system generates a high score, it delivers a warning message to the driver after the perceived risk subsides, since another distraction at that critical moment might be too much for the driver to handle. The intent is to improve driving behavior by letting the driver learn from his or her past mistakes.

SUMMARY OF THE INVENTION

The present invention constitutes an improvement upon the known Rollover Stability Advisor. The basic RSA technology is considered effective, but it has been found that by the time the system recognizes that a truck is in a dangerous state, it is too late for the driver to take action. The RSA system instead has an educational function, informing the driver after the fact and aiming to encourage the driver to drive safer in the future.

Accordingly, one object of the invention is to develop a proactive warning system that uses available additional information to predict imminent rollover situations (that is, a set of conditions that, if allowed to occur, would lead ultimately and unavoidably to a subsequent rollover of the truck), while there is still time to permit the driver to do something about them.

Another object of the invention is to provide such a warning system which avoids false warnings that annoy the driver and reduce effectiveness.

Still another object of the invention is to provide an improvement of which the Rollover Stability Advisor, which is extended to a proactive Rollover Warning System.

These and other objects and advantages are achieved by the rollover warning system according to the invention, which is based on longitudinal speed monitoring and projection, and on the observation that rollovers are caused by a combination of factors, including road geometry, truck physical parameters, and driver behavior. Since drivers generally have no control over the road or the physical characteristics of their trucks, they must adapt their driving behavior to the conditions. If it is assumed that the truck's forward path is fixed to the center of its current lane (which is generally the case, except in lane changing), the only way to avoid dangerous lateral accelerations is to control the truck's longitudinal speed. The rollover warning system according to the invention therefore determines the maximum safe speed (that is, a speed beyond which it becomes unavoidable that the truck will eventually roll over) given the conditions, and warns the driver when he is in danger of exceeding it. Breaking this objective down results in three major system components: determining safe speed, projecting the current state to predict future speed, and determining when to give a warning if the predicted speed is unsafe, a process which is sometimes referred to hereinafter as RSA score prediction.

Other objects, advantages, and novel features of the present invention will become apparent from the following detailed description of the invention when considered in conjunction with the accompanying drawings.

DETAILED DESCRIPTION OF THE INVENTION

For RSA score prediction, it is necessary to project future lateral acceleration of the truck, $a_N$. On a flat road, lateral acceleration at a time t is related to the speed of the vehicle s(t), the curvature of the road K(t), and the superelevation of the road E(t) by:

$$a_N(t) = \frac{s^2(t)K(t)}{g} - E(t) \quad \text{(Eq. 2)}$$

where s is speed in m/s, K is curvature in $m^{-1}$, g is 9.81 $m/s^2$, E is the superelevation as a slope, and $a_N$ is the measured lateral acceleration in g. Curvature and superelevation of the road may be determined from a digital map generated from a probe vehicle data set. According to the invention, vehicle speed is projected using a model of driving behavior generated from the same data set.

Current digital maps from commercial vendors are not suitable for RSA prediction, because they normally lack the necessary vehicle speed and superelevation information, and are also not precise enough. Accordingly, in one embodiment of the invention, a probe vehicle data set was developed in a one-year Field Operational Test (FOT) period. During the FOT, a Roll Stability Advisor (RSA) system and a global positioning system (GPS), among others, were mounted on each of six heavy trucks, which ran daily as part of commercial operation, so the FOT occurred in a real world environment. An on-board computer recorded GPS, RSA, and other types of data during the run, covering about 10,000 hours of driving, or 773,000 kilometers, and the data were uploaded to a server for storage and analysis after the truck stopped, normally at the end of the day. Among the data collected are vehicle position GPS data (latitude, longitude, altitude, time stamp), GPS error estimate (GPS fix, differential age, DOP, etc), vehicle speed, measured lateral acceleration, vehicle operational parameters (brakes, acceleration pedals, wiper movement, etc), and lane-tracker information (offsets to lane marks).

Applicants have developed techniques of building refined digital maps from large amounts of GPS trace data. As described in greater detail hereinafter, first, the GPS points are map matched with a digital map, and the GPS trace is broken into map segments from a commercially available digital map. Then all GPS traces on each segment are collected, and a B-Spline is fit to them to obtain the centerline of the road. (Note that the fitted centerline is not necessarily the center of the road; rather, it captures the average of the actual driving behavior.)

Figure 1:
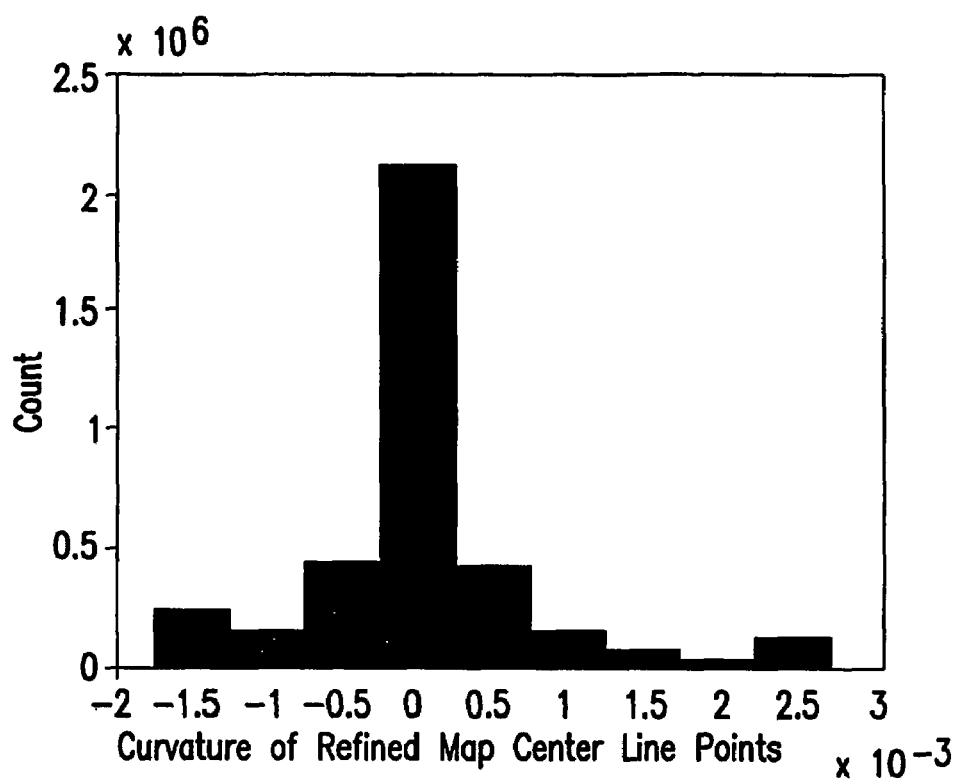
FIG. 1 is a histogram of road centerline curvatures, based on statistical vehicle data.

The vast amount of data from the FOT provides a very good resource for generating refined maps. The accuracy of the map increases with more traversals. Based on the "Bootstrap" statistics method, the accuracy of the map has been determined to be 0.01 meter for some segments where the number of traversals exceeds 200. The curvature along each segment is computed from the derivatives of the spline. (FIG. 1 is a histogram of road curvature; as expected, most roads are straight with curvature 0.) The superelevation is also calculated for some high RSA areas, based on the measured lateral acceleration, speed, and curvature. The super-elevation of the curve lets the truck drive faster around the curve without increasing its lateral acceleration. (It should be noted that "superelevation", which is usually denoted as the letter "e" in equations is related to the "bank" angle θ, by e=tan(θ). For small angle assumptions, tan θ≈θ, so that e≈θ and the numerical values for bank angle and superelevation are practically the same. For the sake of clarity, the term superelevation is used throughout this application, except where the reference is specific to bank angle, which is expressed in radians or degrees.

In addition to curvature and superelevation, in order to detect an imminent dangerous situation the system needs to predict the speed of the truck to compute therefrom its lateral acceleration. Applicants have determined that one advantageous way to predict upcoming speed is to assume that the driver will stay in the same position relative to the overall speed distribution as he moves around the curve. This comes from the observation that, although drivers change speed often, fast drivers tend to drive fast relative to other drivers throughout a curve. Thus, for this purpose it is necessary to estimate the speed distribution at every shape point along a curve, based on the speeds in the data set. With this information, and based on the foregoing assumption, it is possible to predict the driver's future speed.

Using the data generated in this manner, an evaluation was performed to find how far in advance it is possible to predict accurately a crossing of the threshold. For this evaluation, a relatively simple truck model was used that sets a threshold of 0.225 g lateral acceleration, approximating the behavior of the RSA system for fully loaded trucks. This represents a relatively conservative example in that higher threshold values can also be used, depending on the circumstances. One embodiment of the RSA system in fact uses a significantly higher threshold value for fully loaded conditions.

Figure 2:
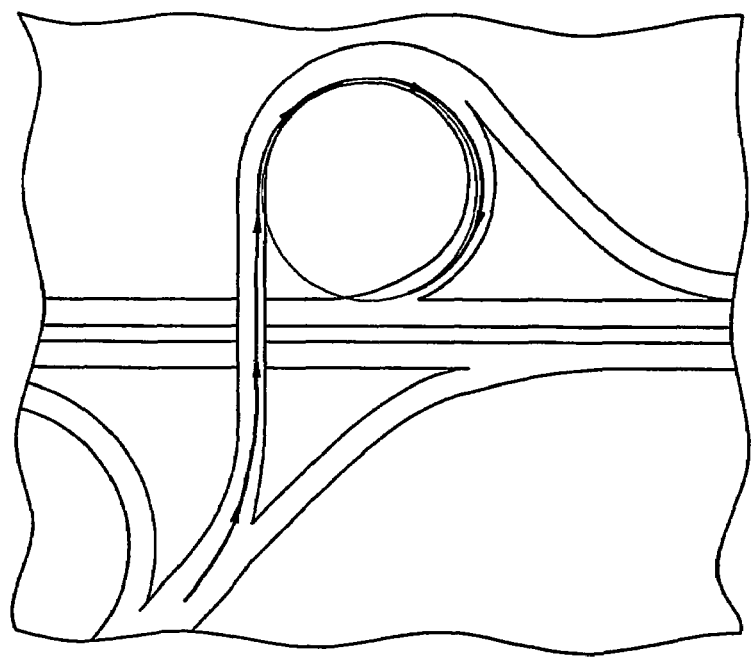
FIG. 2 is a diagram of a road segment.
Figure 3:
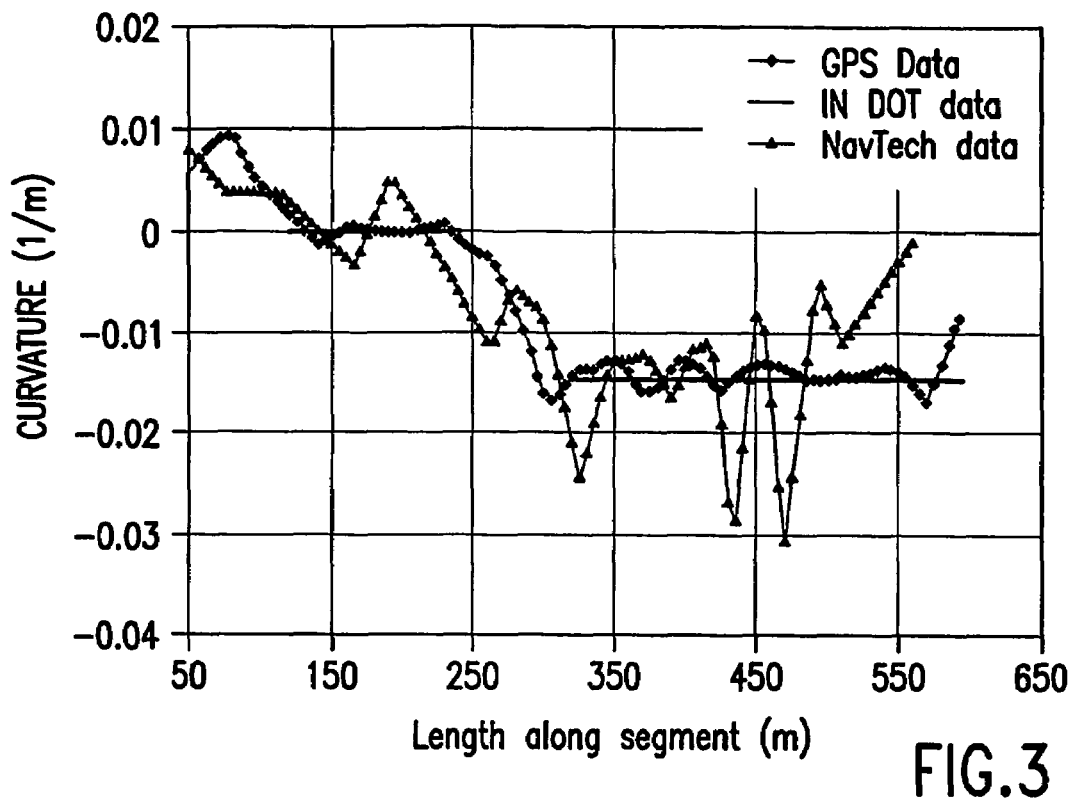
FIG. 3 is a comparison of statistically generated data and ground truth.
Figure 4:
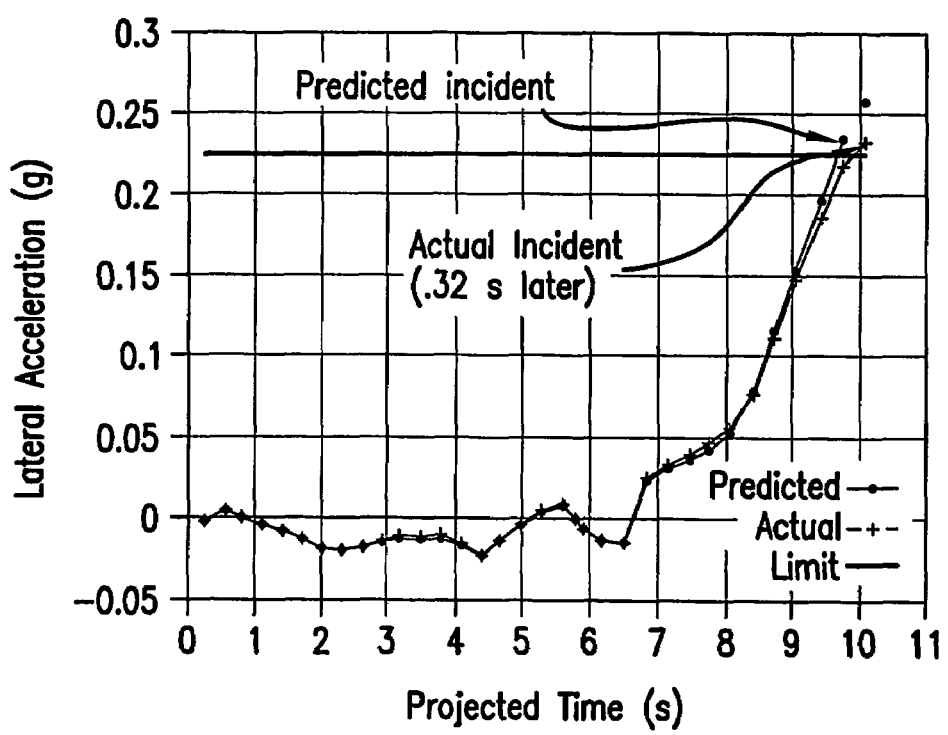
FIG. 4 is a graphic depiction of lateral acceleration vs. time.
Figure 5:
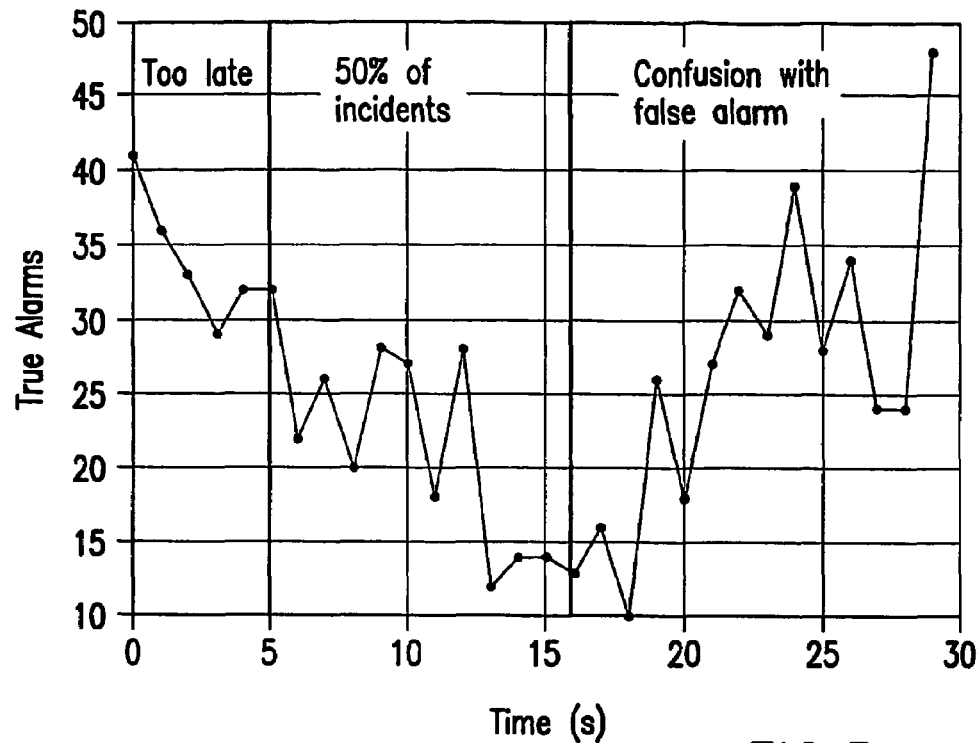
FIG. 5 illustrates alarm rates.

The system was evaluated on one particularly dangerous curve, depicted in FIG. 2. FIG. 3 shows a comparison of the map's curvature with ground truth and a commercial map. The ground truth for curvature is obtained by map fitting a circle to the aerial photo. (Ground, truth for superelevation can be obtained from government sources.) It is clearly shown that our map has significant improvements over normal commercial map in terms of map accuracy for road curvatures. FIG. 4 shows the accuracy of the prediction model for a sample incident. FIG. 5 accurately shows the results for this initial prototype. It was found that 50% of passes with an incident had predicted the incident between 5 and 16 seconds before it occurred, and only 10% of passes without an incident falsely predicted an incident to occur within 16 seconds. A similar evaluation, which was performed with less data to build the map, achieved significantly less favorable results.

Figure 6:
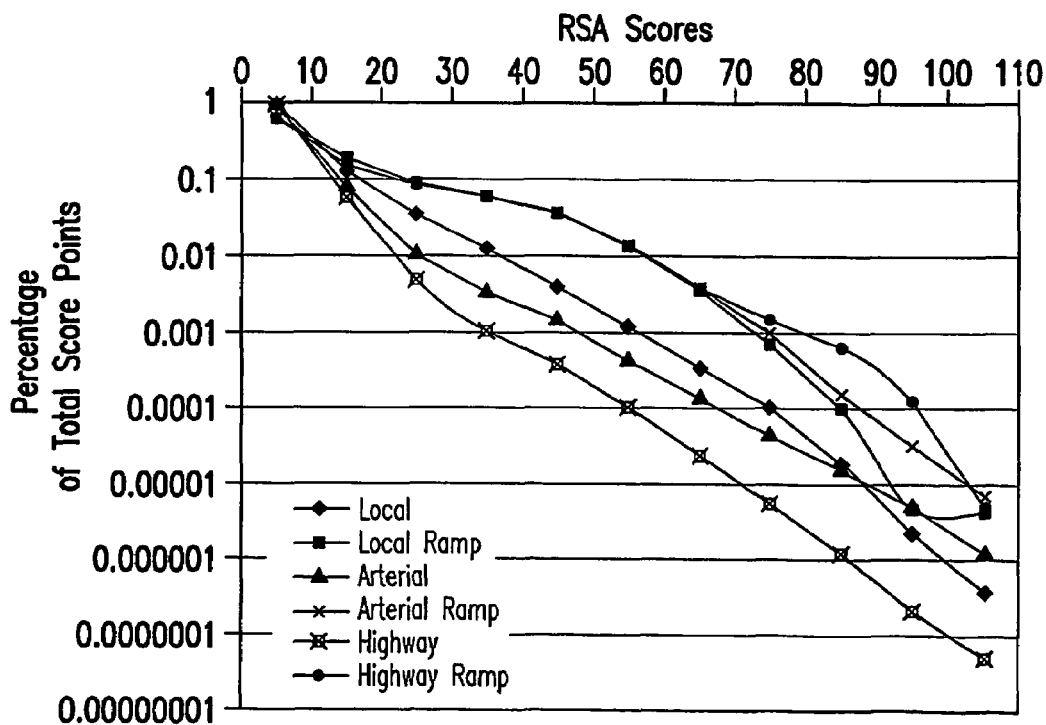
FIG. 6 shows RSA score distributions for different classes of roads.

A preliminary statistical analysis was performed on concentrations of high RSA scores and characteristic driving that leads to high RSA scores to gain an understanding of the characteristics of rollover events. Across the data set, the distribution of high RSA scores for various road classes is shown in FIG. 6. These results show that many dangerous situations occur on ramps, where there is often high curvature for 270 degree turns. Fortunately, all vehicles move in a predictable way on ramps so it may be possible to anticipate dangerous situations. Based on these results, applicants have focused their attention on preventing rollovers on ramps and other roads with high curvature.

On these ramps and similar segments, most traversals go smoothly without excessive RSA scores, but some result in warnings. As an example, we consider "Hotspot 1" described hereinafter. To reduce data volume, only truck 1 was considered in this analysis. Of the 44 passes over this hotspot by truck 1, four result in warnings. In general, these traces result in warnings because their peak RSA score is over 75. A plot of the RSA score for each point on hot spot 1 against its distance into the segment plot shows that the RSA score accelerates quickly when the sharp curve begins, for example one particular trace goes from an RSA score of 0 to 78 in 3.5 seconds as the driver slows down by only 8 m/s. It is interesting to note that behavior in the straight portion is indistinguishable from the nominal traces, but scores in the earlier curve (0-100 m) are on the high side.

Figure 7:
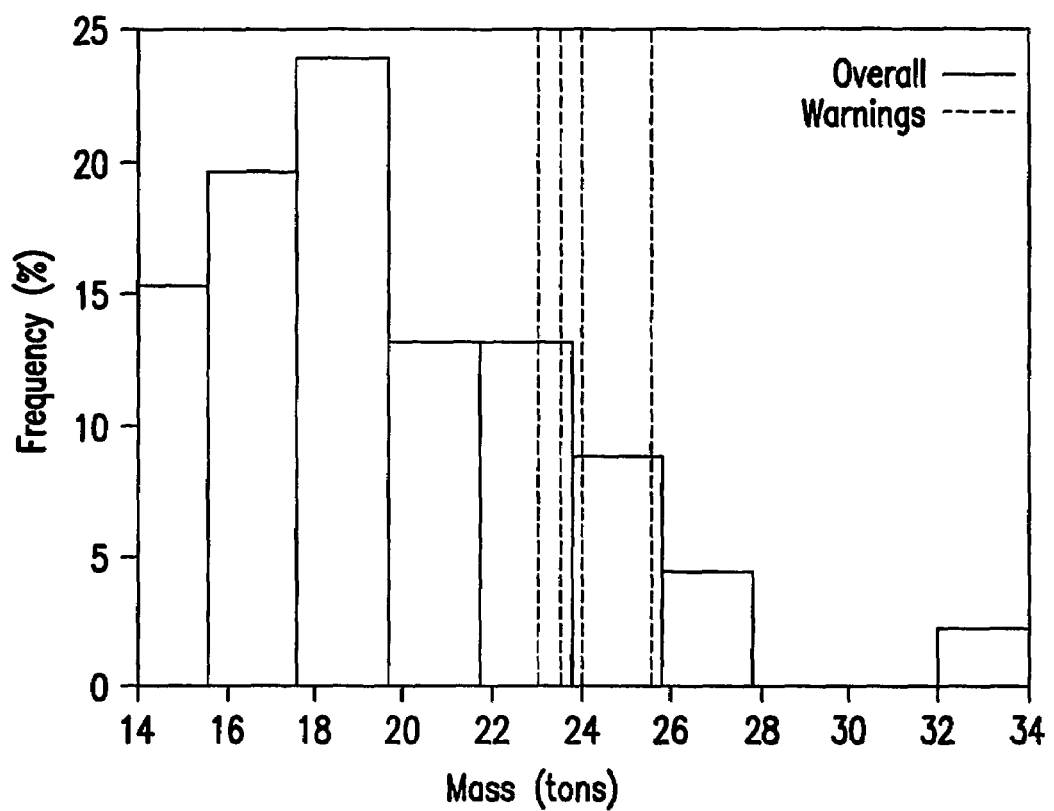
FIG. 7 shows warning frequency as a function of vehicle mass.

A plot of speed relative to distance in hot spot 1 shows that all warning traces are on the high side of the distribution, even in the straight section. But there are several other high-speed traces that do not receive a warning. To understand why that is, it is necessary to examine the other factor in RSA warnings: vehicle parameters (simplified to reflect only mass in these tests). FIG. 7 shows the mass for the warning traces versus the overall mass distribution. All the traces are near the high end of the distribution. It is thus apparent that trucks traveling at a fairly high speed with fairly high loads are especially susceptible to rollover warnings. (It should be noted, however, that the risk is not exclusive to fully loaded trucks. In fact, all heavy trucks could be said to be at a high rollover risk, relative to passenger cars for example. Furthermore, tankers are more at risk when they are partially-filled because of fluid sloshing. Sloshing is not an issue when fully-loaded.) As the load is constant, the main problem is predicting the speed. Since the data show that traces generally stay the same in their speed distribution for some time, it is possible to build a model of future speeds and to predict warnings some time in advance, giving drivers time to slow down before the warning.

As a final observation, RSA scores are still high by the end of the segment, so the curve is not yet finished. At this point, the segment merges with another onramp, but this one is basically straight. This may prove problematic for labeling dangerous segments in the map, because some trucks on this segment (those entering from hotspot 1), will still be experiencing high RSA scores, whereas others (those entering from the straight onramp) will not. It would be better to move the joining node forward so that all trucks completely finish their turn in a single segment.

As noted previously, rollover risk is computed as the fraction of the current lateral acceleration over the maximum safe lateral acceleration. The current lateral acceleration, in turn, is calculated as a function of the vehicle speed, the curvature of the road, and the superelevation of the road, as noted previously. The maximum safe lateral acceleration on the other hand, is a function of the physical characteristics of the truck and its load.

In the case of a liquid load, the load distribution is predictable for a particular type of liquid, because of tank geometry.

Thus, there is a direct relation between the mass of the vehicle and the center of gravity height (or what was referred to above as the "mass distribution"). In general, however, it should be observed that this relation is not always easy to determine for an arbitrary vehicle. Accordingly, determination of the lateral acceleration threshold as a function of the mass is used herein as an example; other models are known and could be used.

Given a known maximum safe lateral acceleration, the curvature and superelevation, of the road at a point x, it is possible to calculate the maximum safe speed of the vehicle at x to be the speed at which lateral acceleration is less than some factor of the maximum (80% for example). This is the instantaneous speed at each point x. (Note that when the curvature at x is 0, speed is infinite.)

Continuous driving at the maximum safe speed requires unrealistic longitudinal accelerations. Accordingly, a continuous safe speed curve (referred to herein as the "red-line" curve) is needed, that is physically realizable by the truck. If a vehicle exceeds this curve, it will not necessarily immediately undergo excessive lateral acceleration, but it will eventually, because it will be physically unable to decelerate in time for the curve. In practice, this curve needs to be computed dynamically for the upcoming road geometry and current vehicle parameters (mass).

There are several possible approaches for determining this "red-line" curve. The simplest way is to directly calculate the velocity at each point which will give the maximum safe lateral acceleration. This velocity can be determined from the relation:

$$v^2 \cdot \kappa - g \cdot \theta = a_N \quad \text{(Eq. 3)}$$

where:
v is the velocity of the vehicle
$\kappa$ is the curvature of the road
$a_N$ is the lateral acceleration
g is the acceleration due to gravity
$\theta$ is the bank angle of the road in radians By setting the lateral acceleration to the maximum allowed lateral acceleration $a_{max}$, it is possible to solve for the maximum velocity.

$$v_{\max} = \sqrt{\frac{a_{\max} + g \cdot \theta}{\kappa}} \quad \text{(Eq. 4)}$$

Figure 8:
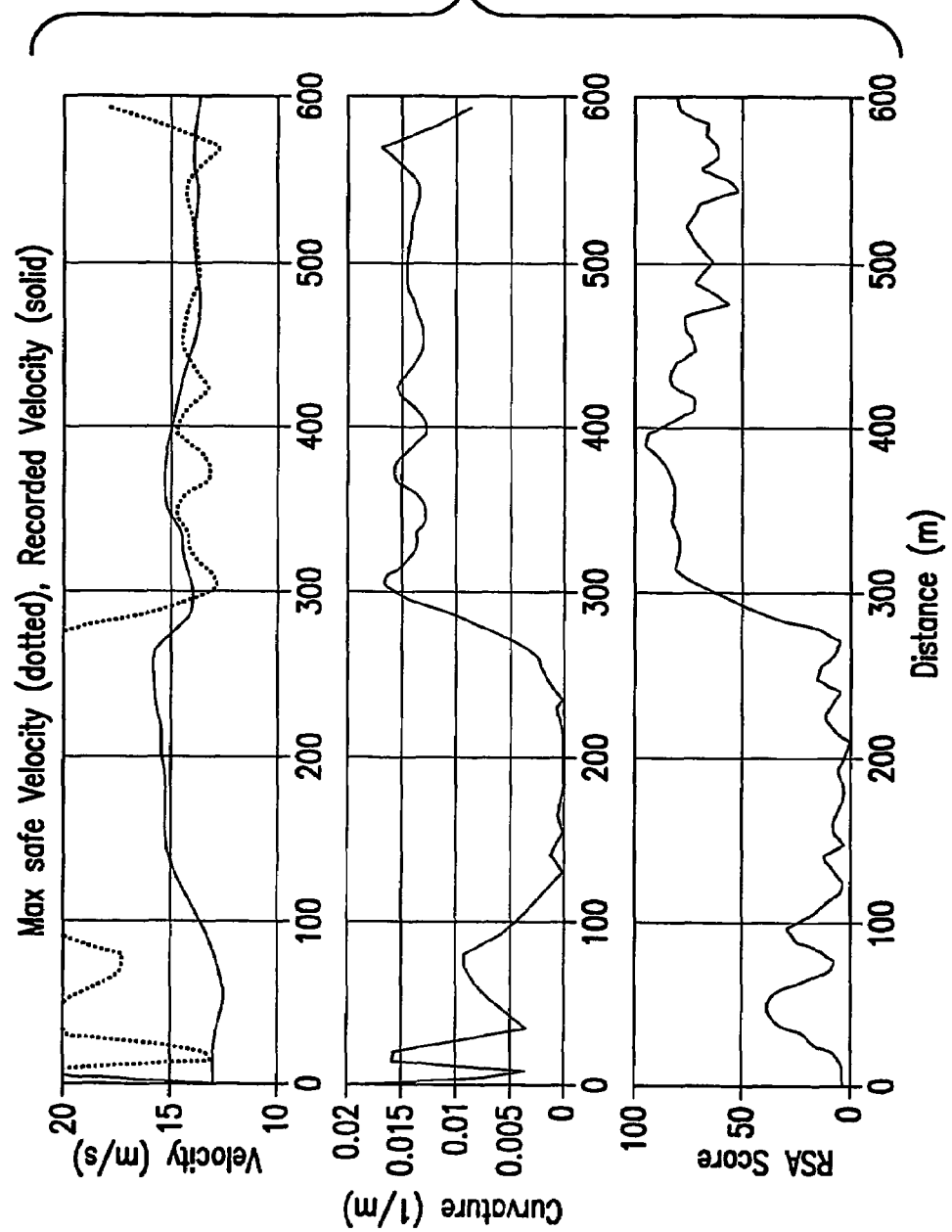
FIG. 8 shows safe velocity curve calculation using current road information.

It is noteworthy that by this equation alone, $v_{max}$ becomes infinite as the curvature approaches 0. Therefore, one would have to introduce a maximum value for $v_{max}$. However, even taking precautions to prevent $v_{max}$ from becoming infinite, this approach does not lead to very useful results, because the resulting velocity curve will have unobtainable accelerations as it will have the same frequency content as the curvature of the road. FIG. 8 shows an example of a safe velocity curve calculated using Eq. 4 for hotspot 1. The top plot shows the calculated safe velocity as a dotted line along with the recorded velocity from the RSA database of tractor #5, trip #917. This particular recording registered high RSA scores, therefore it is included in the figure as a comparison. The safe velocity is calculated with the settings of $a_{max}$=2.75 m/s² and the maximum value of $v_{max}$ set to 20 m/s. The second plot shows the curvature along the road segment and the final plot shows the RSA score in the above mentioned recording.

It can be seen that the algorithm correctly identified that the speed should have been lower in the region 300-400 m, which corresponds to the region of the highest RSA scores. However, the safe velocity curve decelerates from 20 m/s to about 13 m/s over a distance of about 25 m (from 275 to 300 m). This is an unreasonable rate of deceleration for a heavy duty vehicle. Therefore, a useful algorithm must somehow include a look-ahead or prediction element. This is, of course, what normal drivers do everyday when they see upcoming curves and slow down appropriately before entering the curve.

As shown above, it is not adequate to determine the safe speed based only on curvature at the current position. In order for a vehicle to achieve the proper safe speed, the upcoming curvature must be known so that it can decelerate in a comfortable manner. One approach is to determine this safe speed in a predictive manner, based on the ideas of optimal control. A cost function can be defined which penalizes certain conditions of the vehicle, such as high lateral accelerations. Then a series of control inputs (such as the requested engine torque) are determined which minimize the cost function.

The first step in developing this control algorithm is to define the appropriate system equation. In this case, the vehicle state we are interested in is the velocity. The state equation for the velocity is:

$$\frac{d}{dt}v = f(\varphi(t), v(t), T_{eng}(t)) \quad \text{(Eq. 5)}$$

where:

$\varphi(t)$ is the grade of the road at time t $v(t)$ is the velocity at time t $T_{eng}(t)$ is the engine torque at time t It is convenient to define the state equation in terms of a position on a particular road rather than in terms of time. Therefore, the following substitution is made:

$$dt = \frac{1}{v}ds \quad \text{(Eq. 6)}$$

into Eq. 5. In addition, an approximation for the derivative is made to create a discrete equation. The resulting state equation is:

$$v(k+1) = f(\varphi(k), v(k), T_{eng}(k)) \quad \text{(Eq. 7)}$$

Eq. 7 indicates that the velocity at position k+1 is a function of the grade, velocity and engine torque at position k. For the sake of simplicity, the brakes are not included in this equation; rather, only one control input is considered in the system. In this illustration, therefore, the engine torque is allowed to become negative, which is achievable up to a certain extent through the use of the engine brakes.

The next step in the control algorithm is to define a cost function which is to be minimized. The cost function for this system is defined as:

$$J = \sum_{k=0}^{n} J_{\text{lateral\_accel}} + J_{velocity} + J_{fuel} \quad \text{(Eq. 8)}$$

where the individual cost terms are defined as:

$$J_{\text{lateral\_accel}} = \frac{1}{2}K_{accel}(v_k^2 \cdot c_k - g \cdot \theta - a_{\max})^2 \cdot \sigma \quad \text{(Eq. 9)}$$

$$J_{velocity} = \frac{1}{2}K_{vel}(v_k - v_{des})^2 \quad \text{(Eq. 10)}$$

$$J_{fuel} = \frac{1}{2}K_{fuel} \cdot T_{eng}^2 \quad \text{(Eq. 11)}$$

The variable sigma ($\sigma$) which is defined to be equal to 1 whenever the lateral acceleration is greater than $a_{max}$, and 0 at all other times. Therefore, the entire lateral acceleration cost function will only be non-zero if the lateral acceleration should exceed the maximum limit. The other two terms in the cost function (Eqs. 10 and 11) account for velocity errors and fuel usage. (From a purely safety related point of view, it should be noted, the fuel consumption term can be eliminated.)

The individual gain terms (K) in Eqs. 9-11 are used to adjust the weighting on the different terms in the cost function. The sum of the individual cost functions at each point, k, are summed along the entire prediction horizon as shown by Eq. 8. (The prediction horizon is the distance ahead over which the algorithm is trying to minimize the cost, and it is represented by n in Eq. 8.) The reason for such summation is that the goal is not simply to have a minimal cost at any specific point, but to have a minimal cost during the entire maneuver.

The objective now is to find the series of states (velocity) and control inputs (engine torque) which minimize Eq. 3.6 while maintaining the system constraint of Eq. 3.5. This is done in an iterative fashion. First, a desired speed must be chosen for each point along the prediction horizon. This desired speed will be the default maximum speed when the lateral acceleration is not exceeding limitations, for example on straight roads. A reasonable choice might be a function of the speed limit. (It is reasonable to assume that a navigation system will know the speed limit at various positions on the road.)

The algorithm will first calculate the cost if the vehicle drives through the prediction horizon with the desired speed. If there is a curve in the upcoming prediction horizon which should be navigated at a slower speed, then the $J_{lateral\_accel}$ term will have a large positive value whenever the predicted lateral acceleration is higher than the limit. This will cause the overall cost function value to increase. (If desired, the gain for the lateral acceleration term, $K_{accel}$, is set quite high to emphasize this value.) On the next iteration, the algorithm adjusts the speed profile in order to reduce the overall cost. It continues this process several times in order to reduce the cost to a minimum. Notice that the inclusion of $J_{fuel}$ in Eq. 8 forces the algorithm also to consider the fuel consumption in performing the maneuver. The results of this fuel consumption influence will be shown later.

Figure 9:
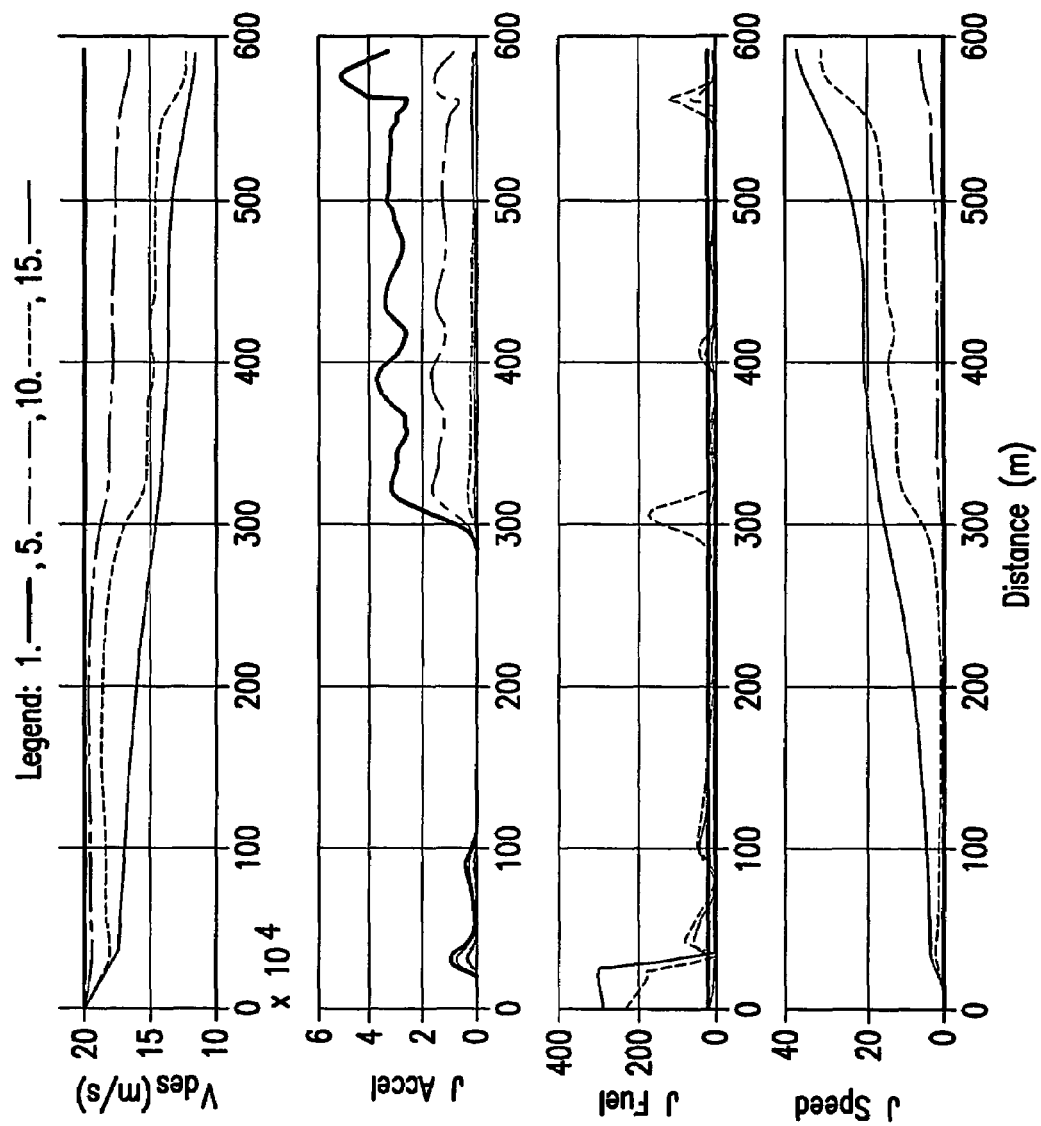
FIG. 9 shows desired velocity and individual cost function data during a maneuver.

FIG. 9 shows the progression of the desired velocity and individual cost function terms during 15 iterations. The first iteration in shown as a dotted line, the fifth as a dashed line, the tenth as a dot-dash line and the fifteenth as a solid line. The desired velocity during the first iteration is just the initially set desired velocity of 20 m/s. While the cost function term from the fuel and speed error is very small (or even zero), the cost due to the lateral acceleration is very high.

In this case, $a_{max}$ was set to 2.0 m/(s$^2$). (The choice of 2.0 m/(s$^2$) is relatively low as it leads to a desired velocity significantly lower than the recorded velocity. However, this value was chosen in order to clearly demonstrate in the discussion which follows, the possible effect of the algorithm. Simulations have also been made at other maximum lateral acceleration values with the expected results of the speed increasing so that the lateral acceleration reaches the desired level.)

As the iterations progress, it can be seen that the velocity is reduced along with the cost due to the lateral acceleration. The cost due to the fuel usage and the speed error increases, but at a much smaller scale compared to the reduction in the lateral acceleration term. This is due to the choice of a very large $K_{accel}$ compared to $K_{fuel}$ and $K_{vel}$. It is clearly better for the overall minimization to reduce the lateral acceleration even at the cost of higher speed error and more controller effort.

Figure 10:
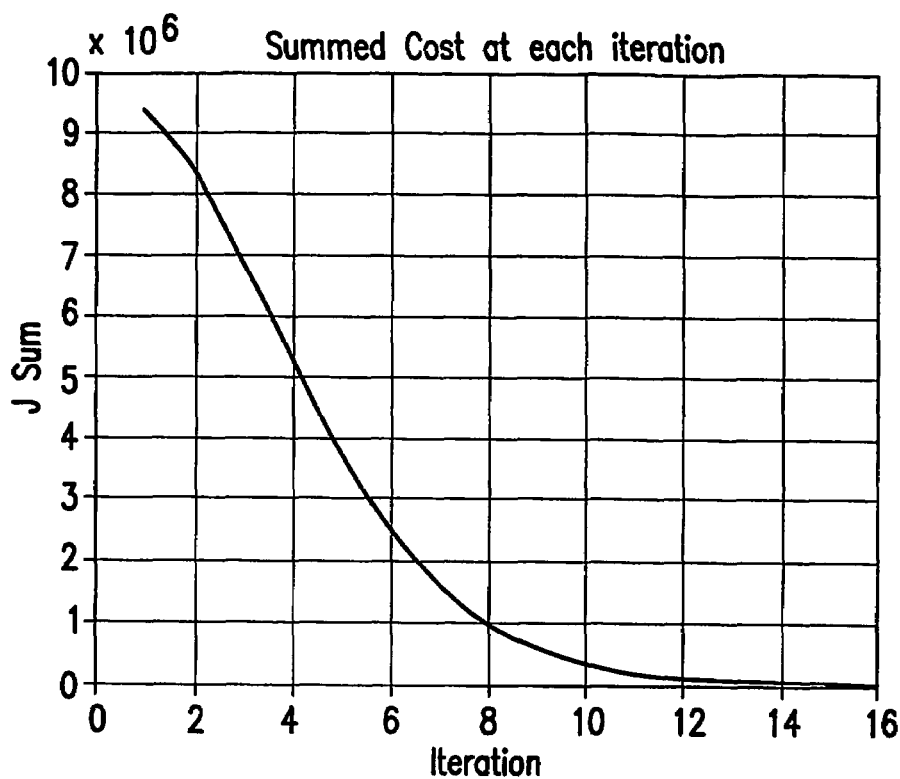
FIG. 10 shows the total cost for a plurality of iterations of a maneuver.

FIG. 10 shows the summed cost at each of the 15 iterations. Clearly, the cost is reduced with each iteration and it appears to have reached a minimum by the final iteration.

When the truck is above the red line curve, it is too late to take action. However, before the truck crosses the line, there is by definition a chance that the driver will not push the truck past the line. In fact, the purpose of a warning system is to change the behavior of the driver so that what might have been a dangerous situation without a warning is corrected. In this case, the warning system must predict that the truck will cross the red line in a few seconds. This gives the driver enough time to slow down safely, but not so much time that the driver will probably correct the situation himself. Concretely, the warning system needs a means to project the vehicle's velocity from a starting point into the future, stopping if and when the vehicle's velocity crosses the red line. Several models, of increasing complexity, could be used for velocity prediction, as follows:

Constant Speed. In the simplest model, when a projection is needed, the model assumes that the truck's speed remains constant. This model performs well in the middle of curves and straight-aways, but fails to predict early enough that the truck will slow down when it is entering a curve, or stop accelerating when it is exiting a curve Constant Acceleration. In the next simplest model, when a projection is needed, the model assumes that the truck's acceleration remains constant. This model performs well in constant speed areas, as well as the beginning and end of curves where the driver is changing speed. However, it cannot predict when the driver will stop changing speed, so only short-term predictions are likely to be accurate.

Global Median. In this model, the predicted speed is the median speed for that point on the road, determined from the speed profiles of all previous trucks passing over the road. It ensures that the predicted speed will follow the general profile of previous vehicles, but it does not take into account information on the current speed; rather, it predicts that the speed at the next map point will be the median, no matter what the current speed or acceleration is.

Constant Percentile. The most complex model is inspired by the observation that drivers who are driving relatively fast in the straight sections often also drive relatively fast on the curves, incurring rollover warnings. If the drivers keep the same relative position in the speed distribution (percentile) for each point of the road, this model will perfectly predict upcoming speed from current speed, and the speed distributions for each map point from previous passes. In practice, drivers will certainly change percentiles, but hopefully not as often as they change speed or acceleration. This model reduces to the Global Median model if the driver's speed is currently in the middle of the distribution.

Finally, once the system predicts a crossing of the red line curve at time t, it must decide the moment at which to warn the driver. One driver response model is that the driver takes some time to respond, then hits the brakes with constant force to decelerate to some speed below the red line. Parameters for this driver model include the driver reaction time, the vehicle's maximum deceleration (which in turn reflects the road surface conditions or friction,), the minimum time necessary to reach this deceleration, and a speed "cushion" to keep away from the red line. Given these parameters, the warning point is the time such that, after the reaction time, the maximum deceleration regime will bring the vehicle to the given cushion below the red line by the time t. This time must be updated dynamically to account for unexpected changes in acceleration.

The velocity prediction function must be at least accurate enough to predict crossing the red line curve, so that the driver can intervene in time. An additional safety function could automatically slow the vehicle when it predicts danger. Since a control system is more predictable and faster-reacting, this function could wait longer before being activated, easing requirements on velocity prediction and permitting fewer false positives.

The mass of data collected during the Field Operational Test offers ample opportunity to calibrate models experimentally, and compare predicted outcomes with actual outcomes. The objective of such experiments is to measure the warning effectiveness, and the sensitivity of the effectiveness to different experimental conditions. In these circumstances, the most appropriate quantity for evaluation of the entire warning system is the predicted time until the vehicle will exceed the maximum lateral acceleration versus whether the vehicle actually exceeds the limit. This approach makes it possible to estimate the accuracy of the warning system as a function of how much advance warning is available. It is also possible to evaluate the individual pre-intervention components separately. In the case of the maximum safe speed, we can evaluate the correlation between actually crossing the red line curve and receiving a warning. The experimental conditions include the quality of the curvature map used to derive the red line curve. Up to four maps can be tested: a spline fit to the geometry in a commercial digital map, a spline fit to a single trace, a spline fit to ten traces, and a spline fit to all available data. In the case of velocity prediction, we can compare the predicted velocity with the actual velocity. The experimental conditions include the choice of model. Evaluations were performed using selected "hot spots" in the data set, where high RSA scores are common.

Figure 11:
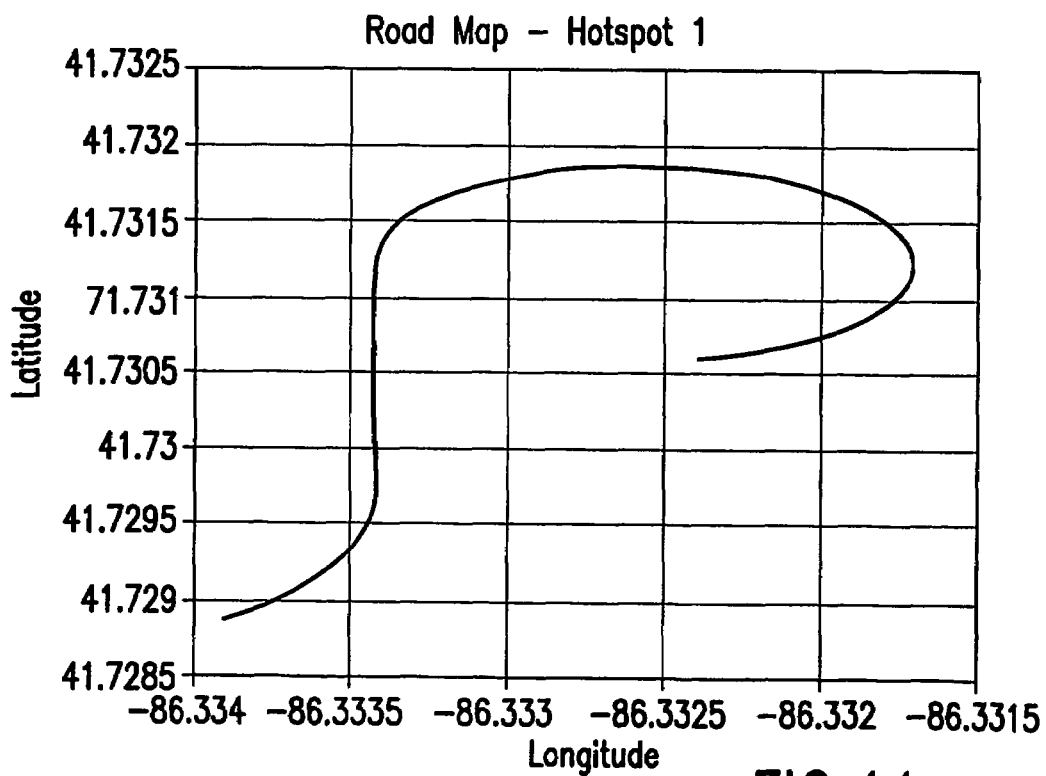
FIG. 11 is a diagrammatic illustration of "hotspot" 1.

The predictive safe speed algorithm described above has been simulated using the road data from hotspot 1, shown graphically in FIG. 11. The starting point, on this road is in the lower left hand corner of the figure (distance=0 point). The simulated data has been compared to the recorded data from tractor #5, trip #917, which recorded high RSA score values.

Figure 12:
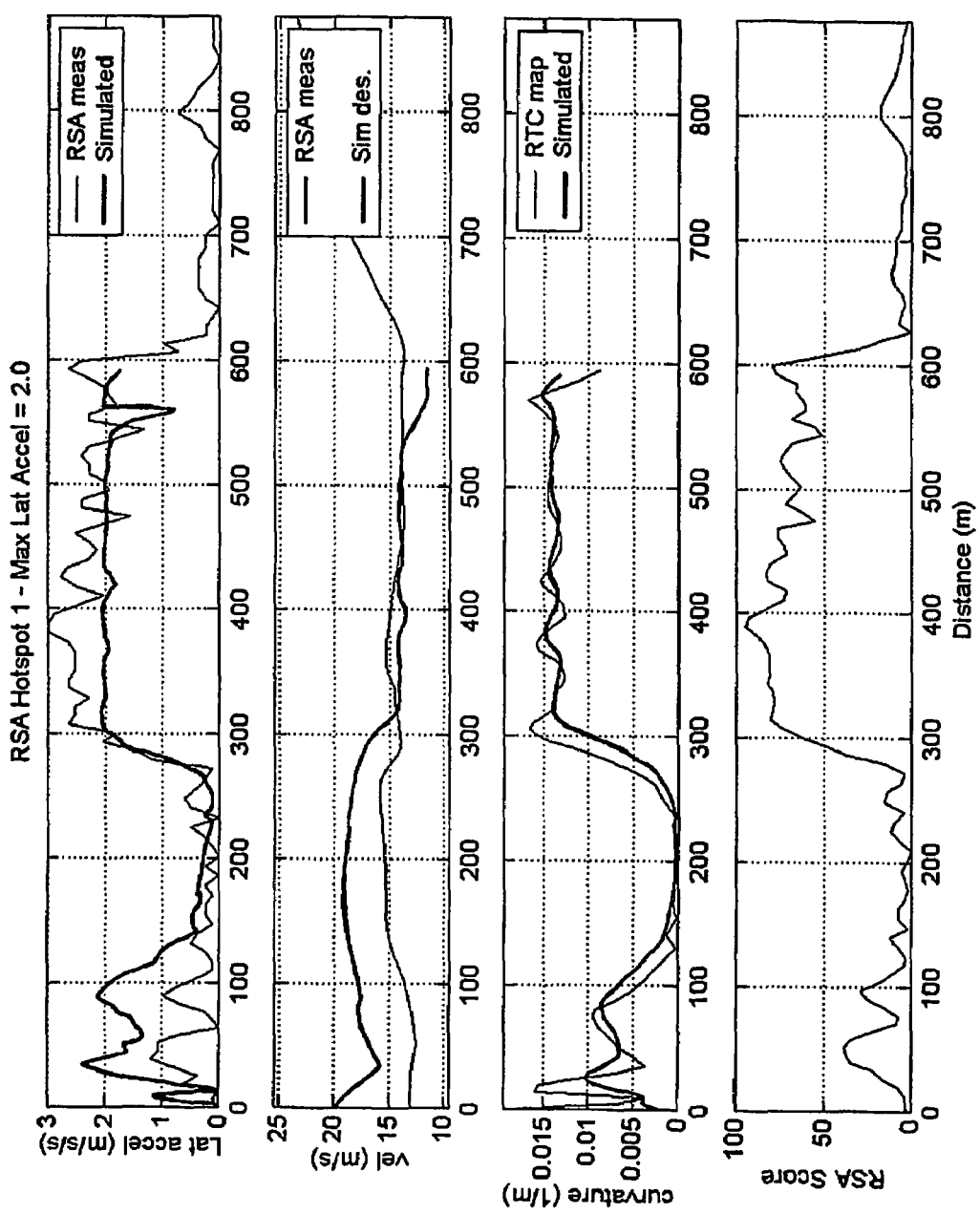
FIG. 12 is a graphic depiction of safe speed simulation results using a first set of cost coefficients.
Figure 13:
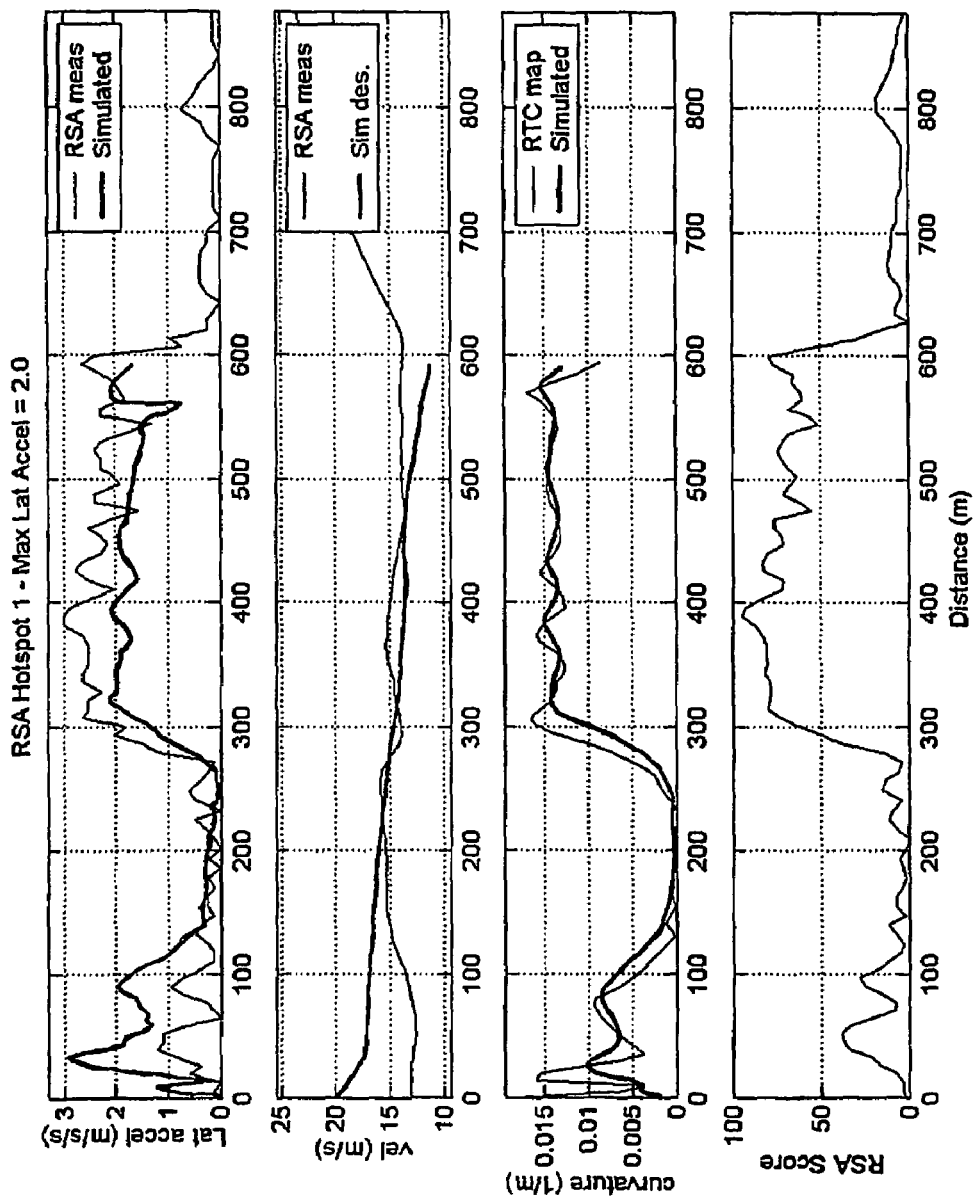
FIG. 13 is a graphic depiction of safe speed simulation results using a different set of coefficients.

FIGS. 12 and 13 show the simulation results when computing the safe speed for hotspot 1. The top plot shows the simulated lateral acceleration and the recorded lateral acceleration. The second plot shows the simulated safe speed and the recorded vehicle speed. The third plot shows the calculated curvature and the curvature taken from the RSA database. The final plot shows the actual recorded RSA score.

The curvature in the third plot is calculated in the RSA algorithm. The reason a value is calculated rather than just directly using the value from the database is that the map information is stored in the RSA algorithm as a series of polynomials which represent the road in all three dimensions. The curvature is then calculated from these polynomials. The third plot just shows how this calculated curvature compares to the curvature created by the statistical analysis of the RSA data.

Both FIGS. 12 and 13 show that the algorithm produced a safe speed trajectory which reduced the lateral acceleration to the desired level of 2.0 m/(s²) in the region of 300-600 m, which had the highest RSA scores according to the last plot. It should be noted that the safe speed leads to higher lateral acceleration values in the first 100 m. This is because the initial desired speed was set to a high value of 20 m/s. The algorithm does not change the desired speed at the very first point. Therefore, it would require an extremely high effort (and in fact may be impossible) to reduce the speed sufficiently before the first point of high curvature at about 20 m. An actual algorithm which was running continuously would not have this problem, as it would see the high curvature far enough ahead to respond properly.

It is interesting to notice the differences in the two figures. The only difference in the algorithm between the two different simulations was the value of the gain on the fuel term in the cost function, $K_{fuel}$. In FIG. 12, $K_{fuel}$ was set 10 times lower than in FIG. 13, such that the algorithm placed more emphasis on the lateral acceleration and the speed error. The result is that the safe speed trajectory rises back up close to 20 m/s in the region 100-300 m where the road curvature is very low. In FIG. 13, the safe speed continues to decrease during this region even though this is introducing a larger speed error. However, it is more fuel efficient to continue to gradually decrease the speed rather than to increase it and have to decrease it again as the vehicle approaches the curvature at 300 m as is done in FIG. 12. The difference can also be seen in the region 300-600 m. In FIG. 12, the velocity changes slightly and the lateral acceleration is rather smooth and stays right at the limit of $a_{max}$. The changing velocity is in response to the slight changes in the grade and bank angle superelevation of the road. This is because it is more cost effective to the control to use the additional control effort and reduce the speed error as much as possible. In FIG. 13, the velocity remains smoother and the lateral acceleration value is noisier in response to the road changes. This is due to the controllers desire to minimize control effort.

In both figures, it can be seen that lateral acceleration makes a sudden jump at approximately 560 m, because this is the end of the data for the superelevation. Therefore, this value is set to 0 which leads to higher lateral accelerations as shown in Eq. 3.

Figure 14:
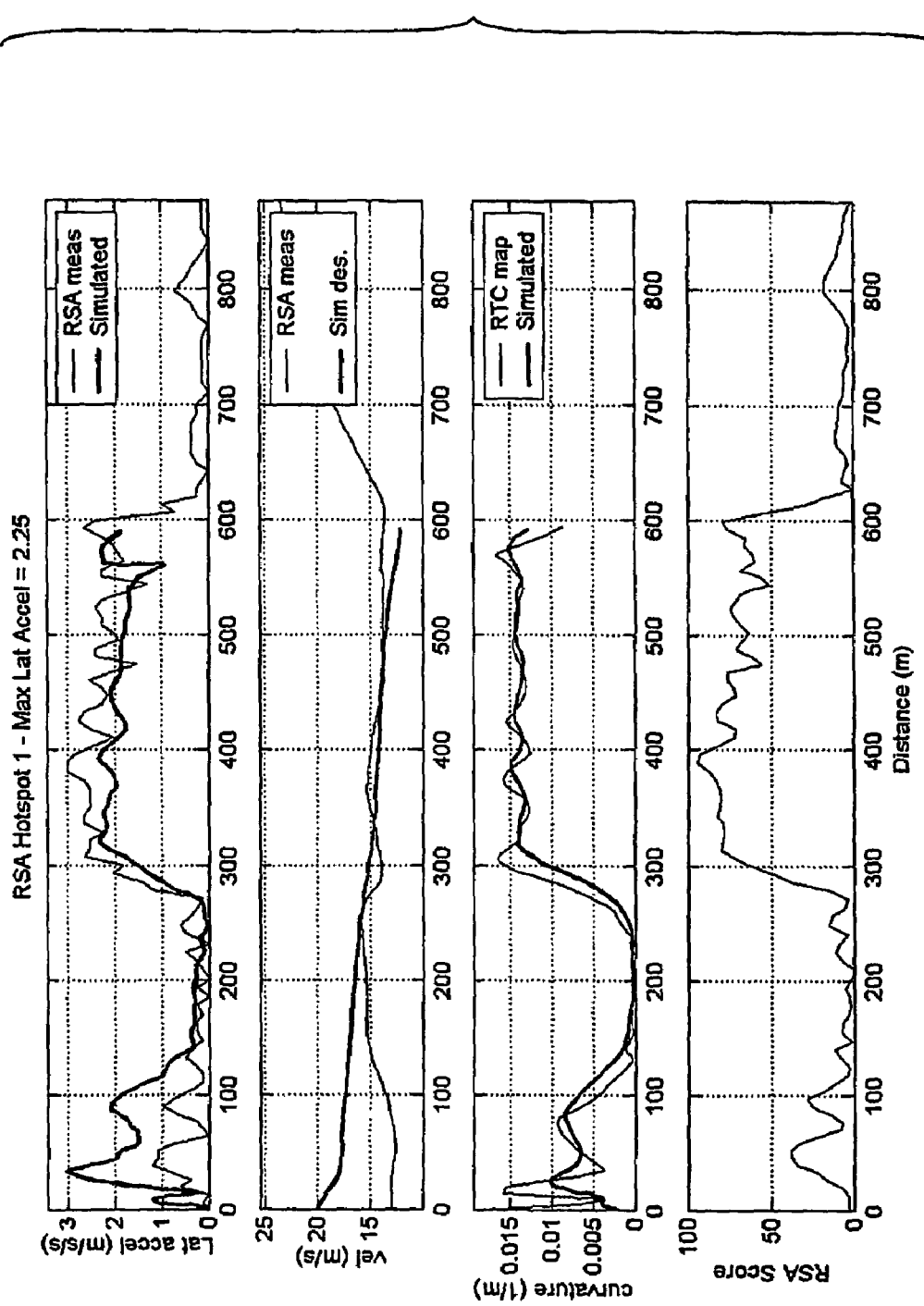
FIG. 14 is a graphic depiction of safe speed simulation results for still another set of cost coefficients.

FIG. 14 shows a simulation with $a_{max}=2.25$ m/(s²). This value was chosen because it is a value which triggers RSA warnings in the experimental vehicles. (As noted previously, other values can be used.) As expected, the simulated safe speed trajectory is less than the measured velocity of the vehicle. The resulting simulated lateral acceleration stays below $a_{max}$ in the region of 300-600 m, where the high RSA scores occurred.

Figure 15:
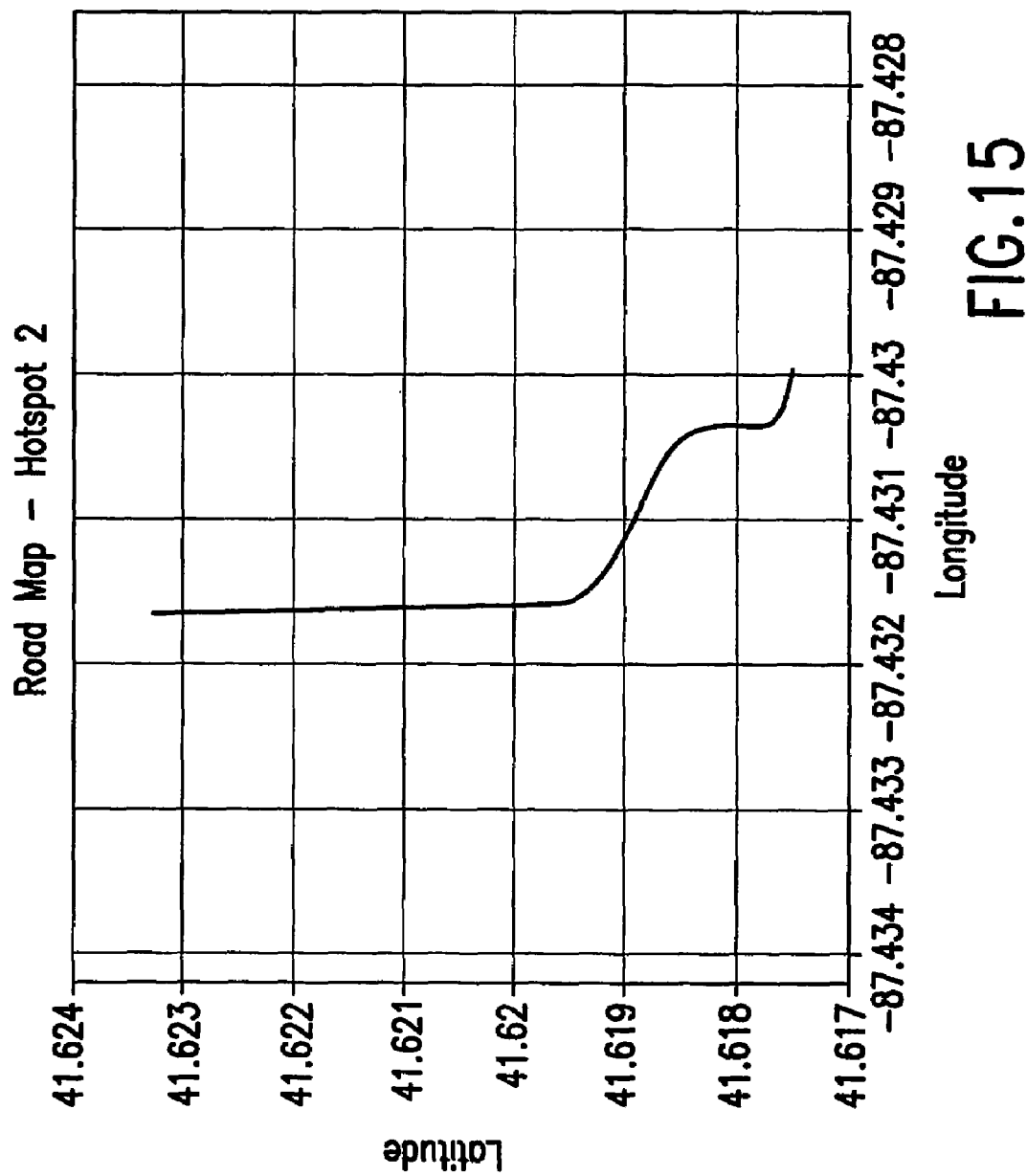
FIG. 15 is a diagrammatic illustration of hotspot 2.
Figure 16:
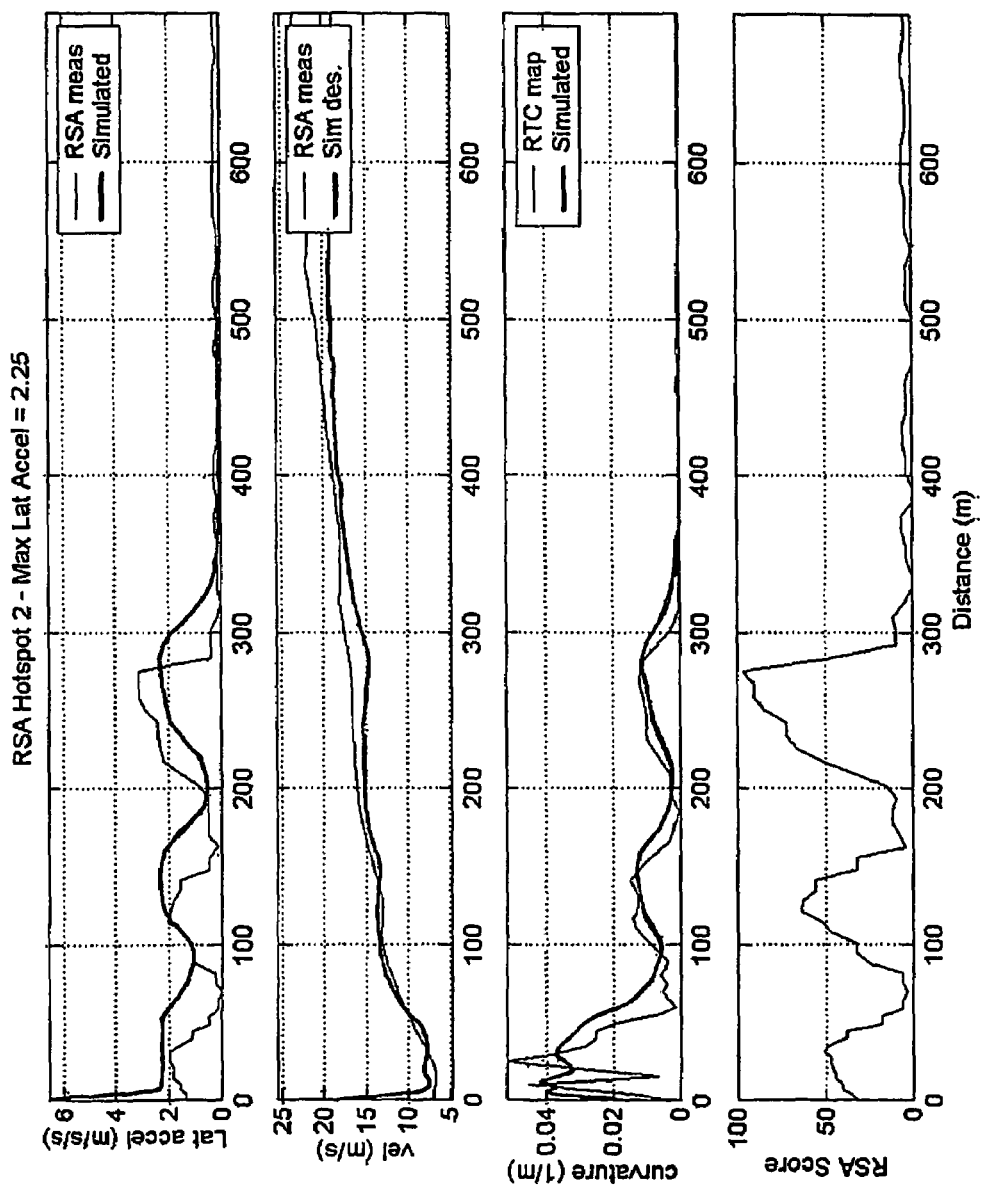
FIG. 16 is a graphic depiction of a further simulation result.

The safe speed prediction algorithm was also tested on hotspot 2, shown graphically in FIG. 15. FIG. 16 shows the results of the simulation compared to the actual results taken from tractor 1, trip 939. The velocity plot shows that the calculated safe speed is less than the measured vehicle speed particularly in the region 200 to 300 m. This results in the lateral acceleration staying below the $a_{max}$ value of 2.25, whereas the measured lateral acceleration for this particular location reached about 3.0 m/(s*s) in this region.

The four speed prediction models were run for hotspots 1 and 2 described above. First, for those models that need a speed distribution, the Field Operational Test dataset was used and distributions were built for each map point on each hot spot. Second, for every pass over the hotspot, data for that pass were removed from the distribution (a technique known as "leave-one-out cross validation"), and for each point on the pass the speed was projected forward using the four models. At each map point, the models made a speed prediction, and the actual speed was measured.

At each point in the trace, each model begins making its own predictions on the future speed profile. The constant speed model does best in the second half of the hot spot, where the driver keeps a constant speed according to the actual speeds. The constant acceleration model does not do as well as the distance from the start point grows large, but it does remarkably well predicting the deceleration in the middle of the hot spot. The global median model makes the same predictions for each point. In this case, it performs poorly because this pass is quite slow—the mean percentile is 14.6. The constant percentile model predicts the deceleration and the constant speed portions quite well, for a very good result—for predictions 10 seconds in advance or less, mean absolute speed error is only 0.35 m/s.

Figure 17:
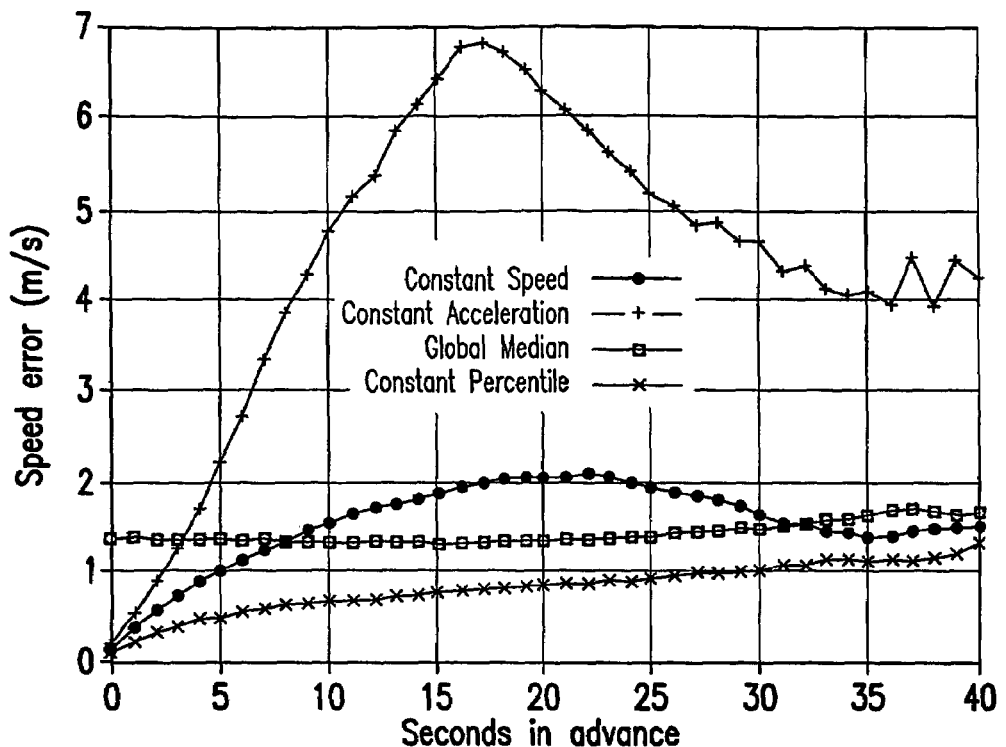
FIGS. 17 and 18 shows the overall results for hotspots 1 and 2.
Figure 18:
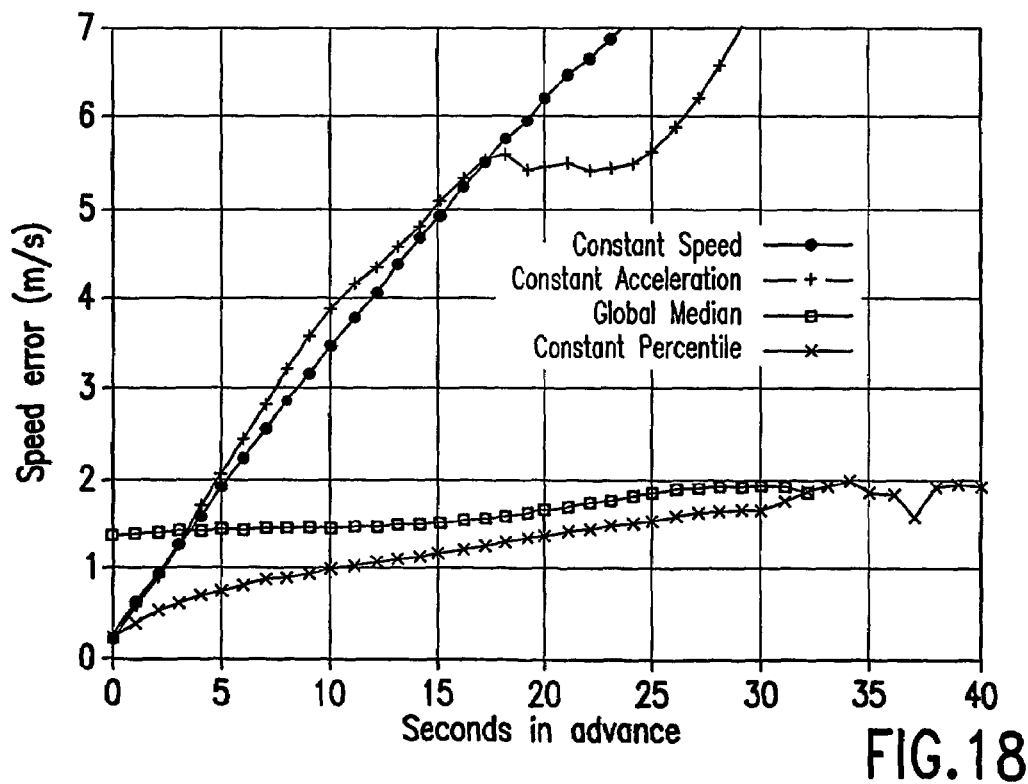

FIGS. 17 and 18 show the overall results for hot spots 1 and 2. Results for hot spot 2 are slightly less favorable, but the constant percentile model is clearly the best for both areas. There is a strange hump in the results for hotspot 1 that is probably an artifact of the shape of the curve. Overall, the constant percentile model performs well, with mean accuracy of less than 1 m/s after 10 seconds.

The warning system can use the vehicle velocity predictions, coupled with the known curvature and superelevation on the upcoming road, to predict the lateral acceleration of the vehicle as it moves around the curve. (Superelevation can be calculated in a manner described hereinafter, and is also available from government sources; the values are contained in the map.) Such acceleration may be used in a physical simulation to predict whether the vehicle will roll over. If the system predicts a rollover, it can intervene by warning the driver or slowing down the vehicle. Instead of a complex simulation, the current RSA device uses a lookup table indexed on the mass of the truck to find the precomputed maximum lateral acceleration for a truck of that mass. If the truck's acceleration is more than 75% of that limit, the device activates a warning. A predictive warning system can extend this method to predict how close the truck will be to the limit, and react accordingly.

Such a simple warning system has been evaluated based on the FOT data, using the percentile model for speed prediction. For each speed prediction sequence, the predicted lateral accelerations were computed and compared with the actual lateral accelerations. If the actual acceleration crosses the limit (set to 0.225 g, as in the speed limit computations), it indicates a future warning. If the predicted acceleration crosses the limit, it indicates a warning message. For each sequence, there are four possible results:

1) True positive. The system projects an excessive acceleration to occur, before or when the excessive acceleration actually occurs. A good prediction system would discover this as early as possible.
2) True negative. The system never predicts an excessive acceleration, and there is none.
3) False positive. The system projects an excessive acceleration, but there never is one. This error is serious if it occurs so often that the driver ignores legitimate warnings.
4) False negative. The system never predicts an excessive acceleration, but there is one. This is the most dangerous error. Even a poor prediction system would rarely completely miss a dangerous maneuver, but the warning may come too late to do any good.

The results of this evaluation, based on hotspot 1, are as follows:

1) True negative. The lion's share of the predictions, 90%.
2) True positive. Excessive acceleration predicted on average 10 seconds before exceeding the limit, giving the driver enough time to react.
3) False positive. Excessive acceleration wrongly predicted to occur after (on average) 26 seconds elapse. The predictive accuracy seems to fall off somewhere between 10 and 26 seconds.
4) False negative. On average, missed dangerous maneuvers occur after 11 seconds of elapsed time. They are usually corrected promptly as the driver gets closer to the dangerous spot.

One final evaluation considers how much data is necessary to make these accurate predictions. It may be recalled that the data were used to estimate three relevant attributes along the curve: curvature, superelevation, and speed distribution (for the percentile model). It is possible to derive a rough curvature from the shape points using a commercial map database and their recommended algorithm, but there is no way to determine the superelevation or the speed distribution using only the information contained in such a map. It is also possible to use a single trace, and a known curve fit optimized for this task. The curvature was somewhat better, but the superelevation estimate was very poor. Even worse, there was only a single sample of the speed distribution, making the percentile model impossible.

Finally, we considered using a lower-quality map which provides estimates of all the relevant attributes, but with less precision. However, as described previously, the centerline accuracy decreased by a factor of four, and a similar reduction in accuracy would be expected for the other attributes. The results are similar to the full data set with one exception:

1) True negative. Again the majority prediction, with 85% of the predictions.
2) True positive. Again, on average predicted 10 seconds in advance.
3) False positive—Predicted on average only 21 seconds in advance, reflecting a slightly poorer predictive accuracy.
4) False negative. Predicted on average 16 seconds in advance, giving even more time for corrections.

These results suggest that only ten or fewer passes are needed to project the speed and lateral acceleration of a vehicle accurately enough to provide warning at least ten seconds in advance of a dangerous maneuver. However, it is noted that the accuracy of the low quality map for Hotspot 2, also produced with ten traces, is twenty times less accurate than the high quality map. So ten traces may not be enough in all cases, if the position accuracy is low.

Applicant's studies have confirmed that with a map made from ten passes, and the percentile speed prediction model, it is possible to provide drivers with enough advance warning to avoid dangerous situations.

It may be possible to predict vehicle speeds even better with a more sophisticated model, such as a hybrid model that uses acceleration for the first several seconds then switches to the constant percentile model, or a variable percentile model, where the vehicle's speed percentile changes according to the driver's typical habits.

While the foregoing describes a safety system that is intended to avoid accidents, it is also possible to adapt the same principles to a comfort system that advises the driver or controls the vehicle to keep the lateral acceleration of the vehicle within a "comfort zone" in rounding a curve. This implies a lower "blue line" speed curve, perhaps personalized to the g-force preferences of individual drivers, and control algorithms designed to keep the vehicle near the curve as much as possible.

The rollover warning system described herein, which warns the driver ahead of a curve if the situation is dangerous, and possibly automatically slows the truck, requires a prediction of the rollover score, which in turn requires an accurate estimate of radius of curvature. For this purpose, applicants have created highly accurate maps with curvature from large collections of less accurate positioning traces, in the manner described hereinafter.

Figure 19:
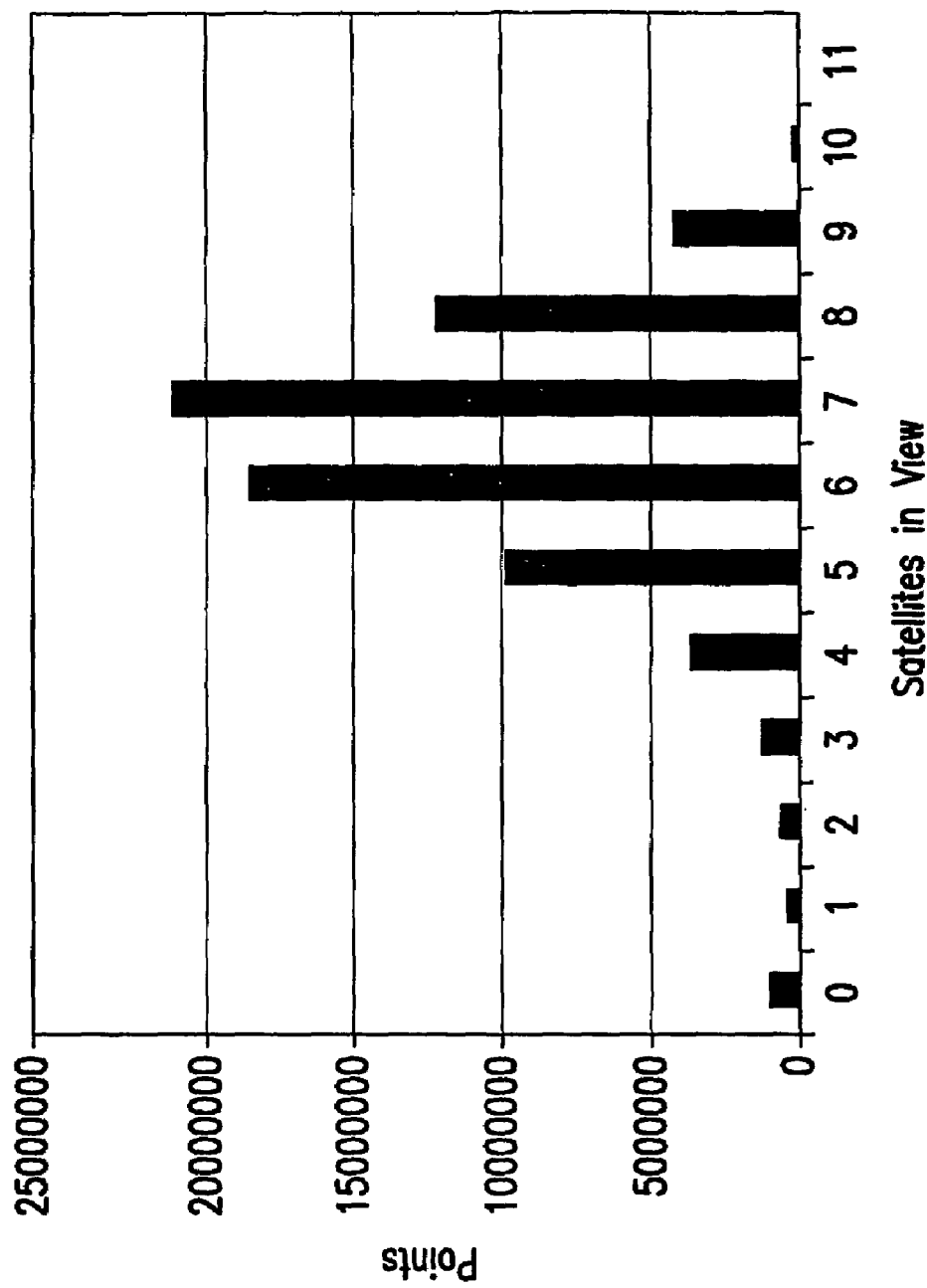
FIG. 19 is a histogram that shows GPS satellite visibility.

Development of Map Data. Using a fleet of six liquid nitrogen deliver trucks, as described previously, positions were recorded twice a second, using a differential GPS receiver. At each position, the onboard computer recorded time, longitude, latitude, height, dilution of precision, heading, speed, and number of satellites. GPS requires at least four visible satellites to make a position fix; more is helpful because the geometry is likely to be better. (The histogram in FIG. 19 describes the satellite availability.)

Ninety-six percent of the data reflect differential corrections. There are about eight differential beacons in range of at least part of the test area. Although the test data did not indicate which beacon(s) were in range for differential corrections, this data can be used to make a rough map of differential availability.

The accuracy of the raw data is a key issue, but similarly important is a good accuracy estimate, which can be used to eliminate or deweight poor quality data. Most DGPS errors come from three sources: driving error (the difference between the driver's path and the center of the lane), satellite errors (few satellites or poor geometry), and differential errors (corrections too old or base station too far). Studies have shown that driving error is typically 10-30 centimeters. Satellite errors can be estimated with the dilution of precision measure, available from the receiver. Differential age is obtained from the receiver, and the location base station can be looked up.

Figure 20:
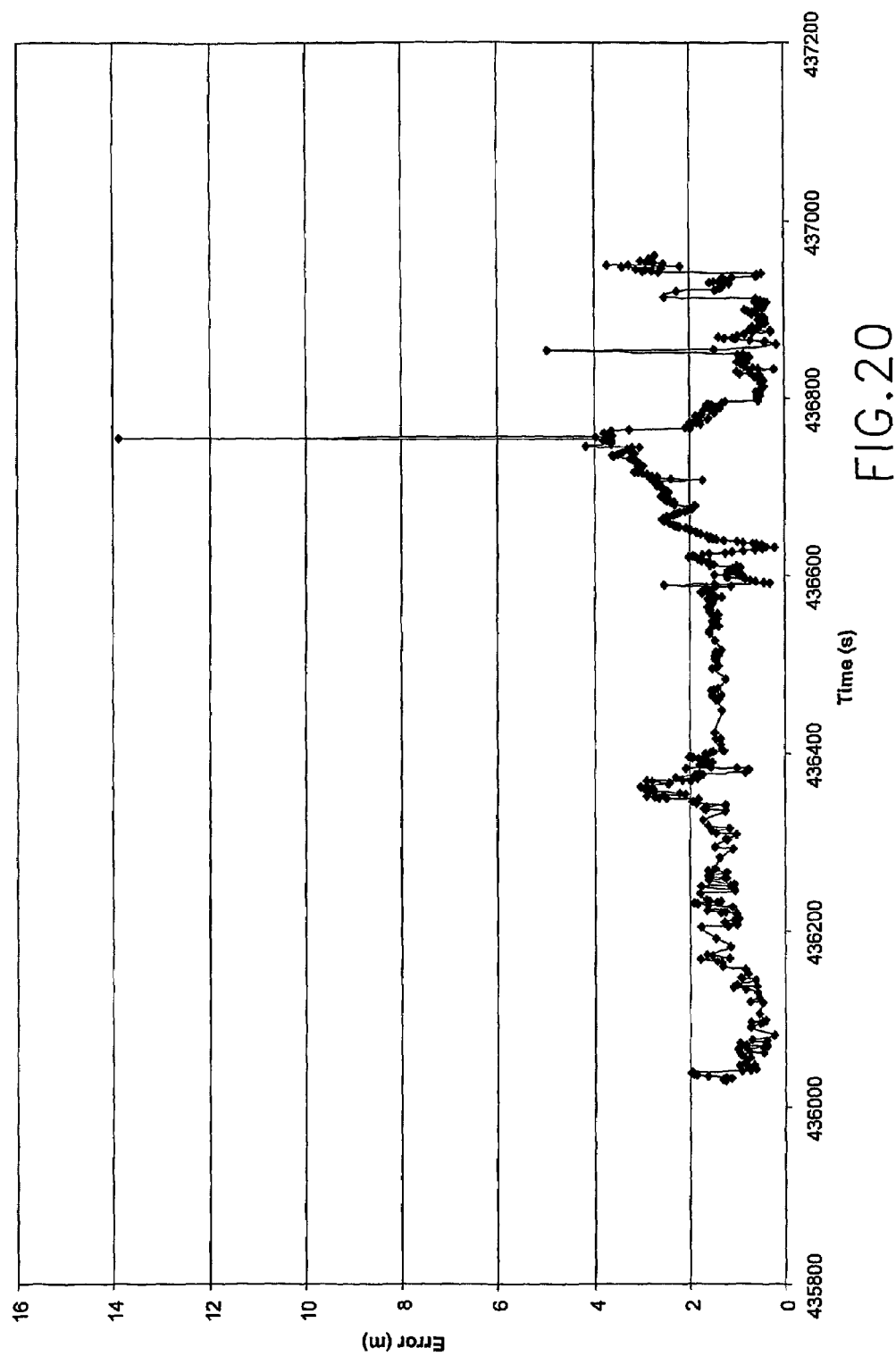
FIG. 20 shows DGPS error in comparison with a carrier-phase receiver.

The error of a single position can be estimated as a function of these measurable factors, based on available ground truth data. Using a carrier-phase receiver synchronized with the same model DGPS receiver as was used in the data collection, it is possible to determine the actual error of the position to within a few centimeters. (FIG. 20 shows position error versus time for one data run.) Finally, the error can be correlated with the available measurements, to see which measurement is most predictive of the actual error. Based on this study, applicants have found that the horizontal dilution of precision is a usable error estimate, so further processing weights data on this error.

Map Matching. The first stage in processing is to separate the traces into map segment traversals, according to a baseline digital map (a commercial product that represents some of the roads in an area). The segments are the pieces of road between two intersections, or an on- or off-ramp on a highway. All later processing is based on collecting all portions of traces that traverse the same segment, which is therefore a crucial step. Applicants used a digital map developed by Navigation Technologies™, which includes about 1000 of the largest cities in full detail, while the rest of the region contains just interstates and major roads.

Figure 21:
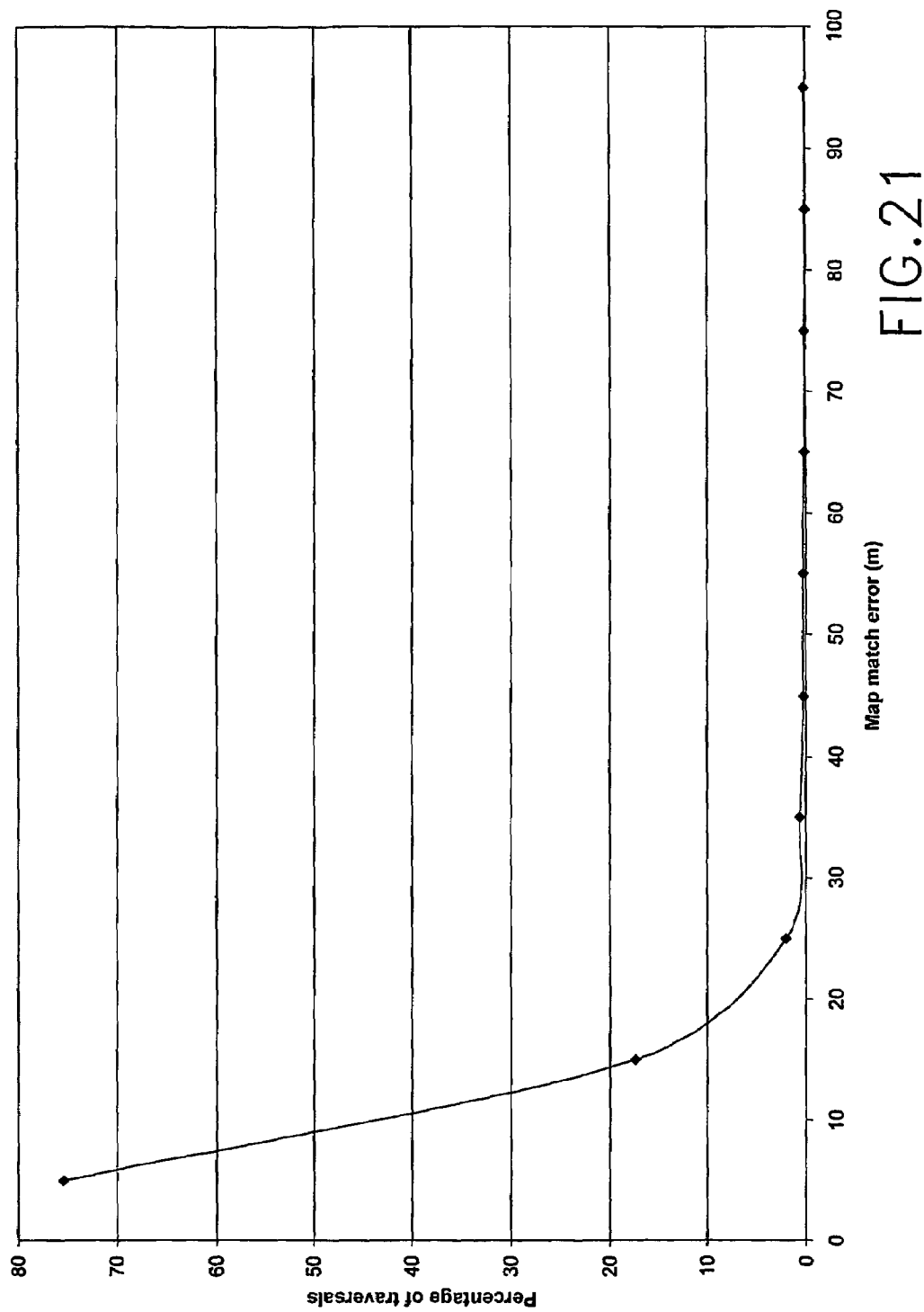
FIG. 21 shows map matching error vs. percentage of traversals.

The map matching process takes an entire trace and finds the sequence of segments that minimizes the distance between the trace and the sequence, using a Dijkstra shortest path-style algorithm. The map matcher produces a table of segment traversals, each containing a segment identifier, the time of entry, the duration of the traversal, the mean distance from the map (which itself has an error of up to 15 meters from the true road centerline), and some general segment attributes such as road class, road name, and estimated transit time. The map matcher is not perfect, because it is dependent on the accuracy of the GPS data, the accuracy of the baseline digital map, and the assumption that the vehicle is on a segment in the map. 87% of the data matched some segment, for a total of 567,000 segment traversals. FIG. 21 shows the distribution of errors in map matching. Errors of more than 20 meters probably indicate a mapmatching error, and such traversals were not used.

Figure 22:
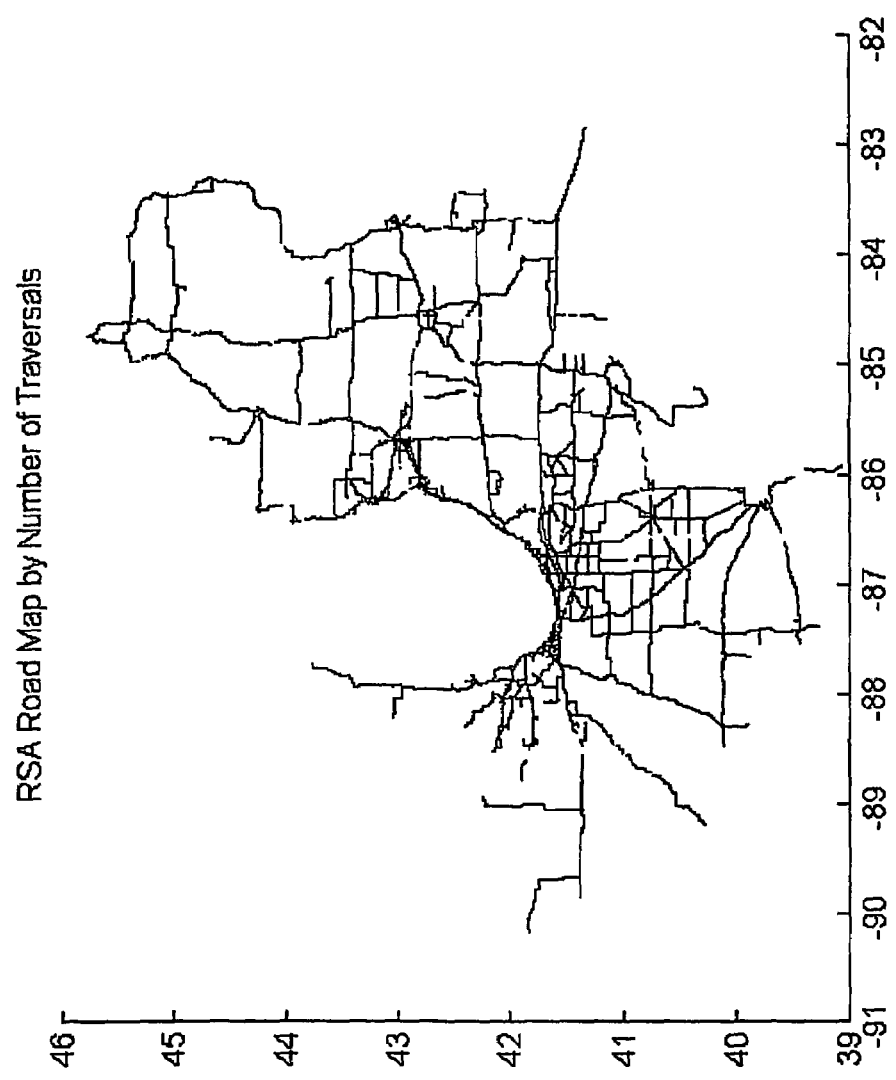
FIG. 22 is a diagrammatic illustration of the road network used to generate statistical data.
Figure 23:
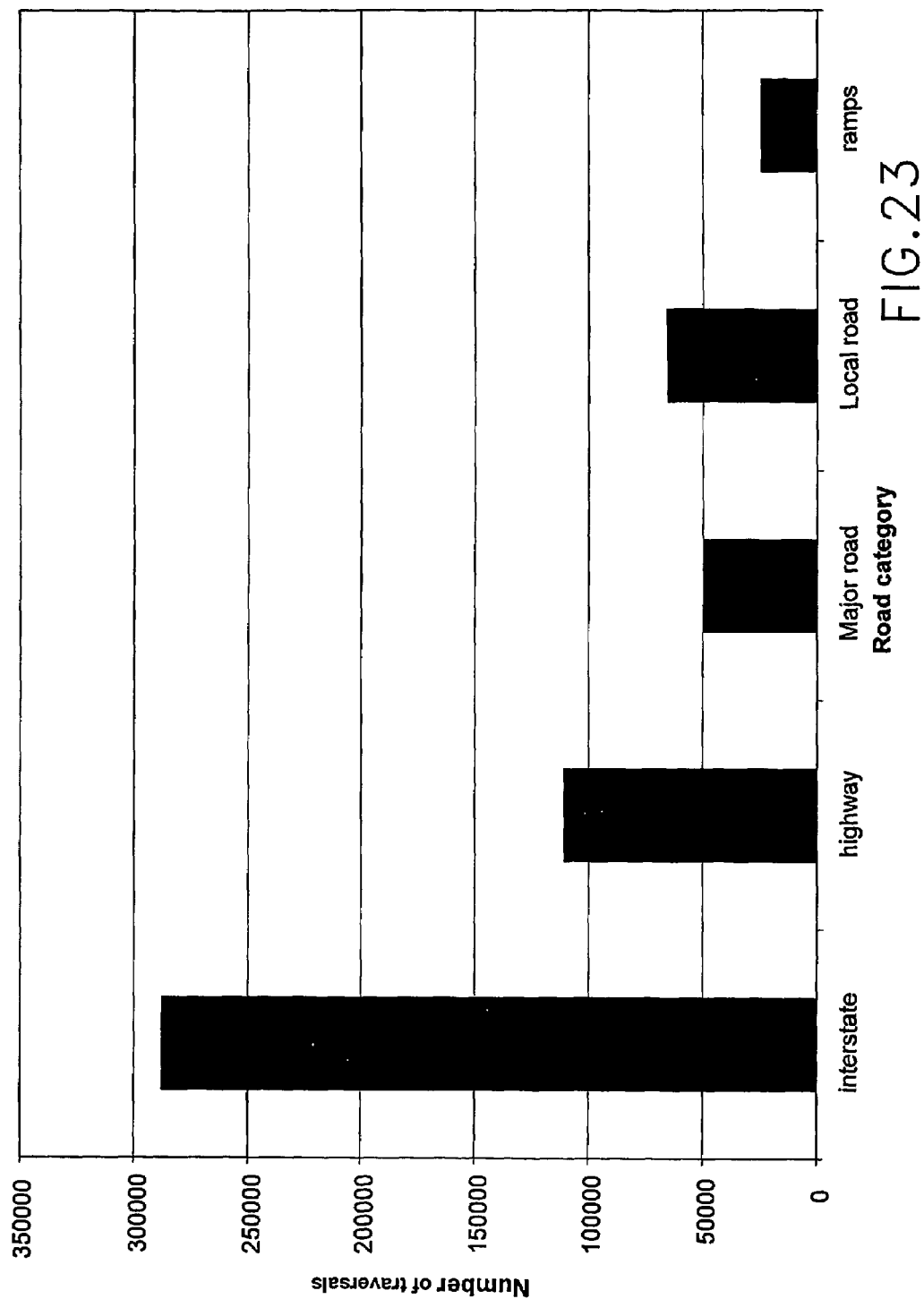
FIG. 23 shows the number of traversals by road category.
Figure 24:
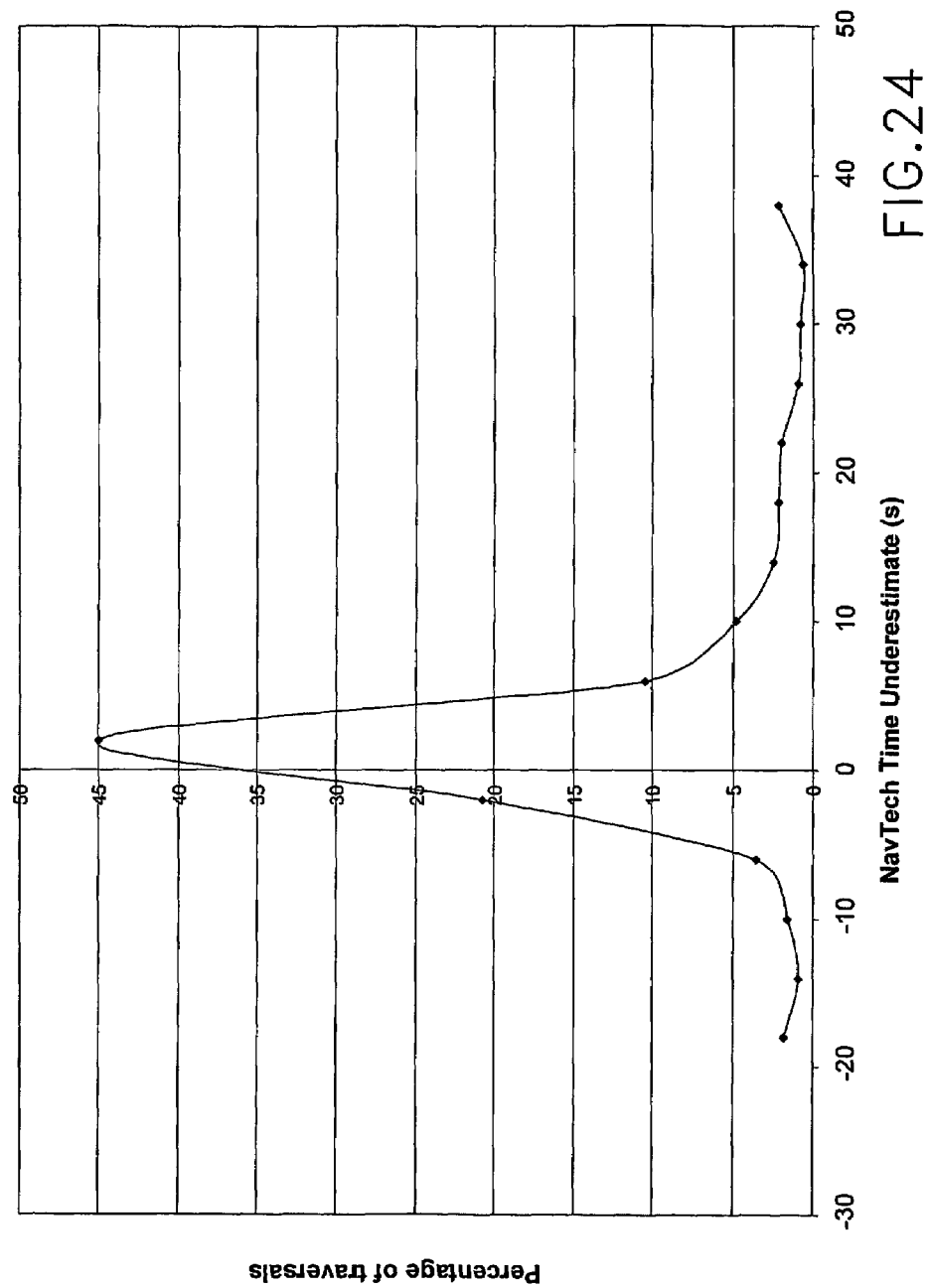
FIG. 24 illustrates transit time errors.

A byproduct of this processing step is some insights into the fleet's travel patterns. The main transit routes are shown in FIG. 22. Also, it is interesting to analyze the types of roads normally driven as depicted in FIG. 23. It is also possible to refine attributes of the digital map besides geometry. The NavTech™ transit time estimates are very crude and do not reflect actual driving behavior. Using applicant's data, it is possible to evaluate the accuracy of the estimates by comparing them with the actual traversal times. The distribution of the difference between actual and estimated transit times is in FIG. 8. The agreement is generally good, but there are many more longer actual times (70%) than shorter (30%), possibly because the estimate is calibrated for passenger cars.

Figure 25:
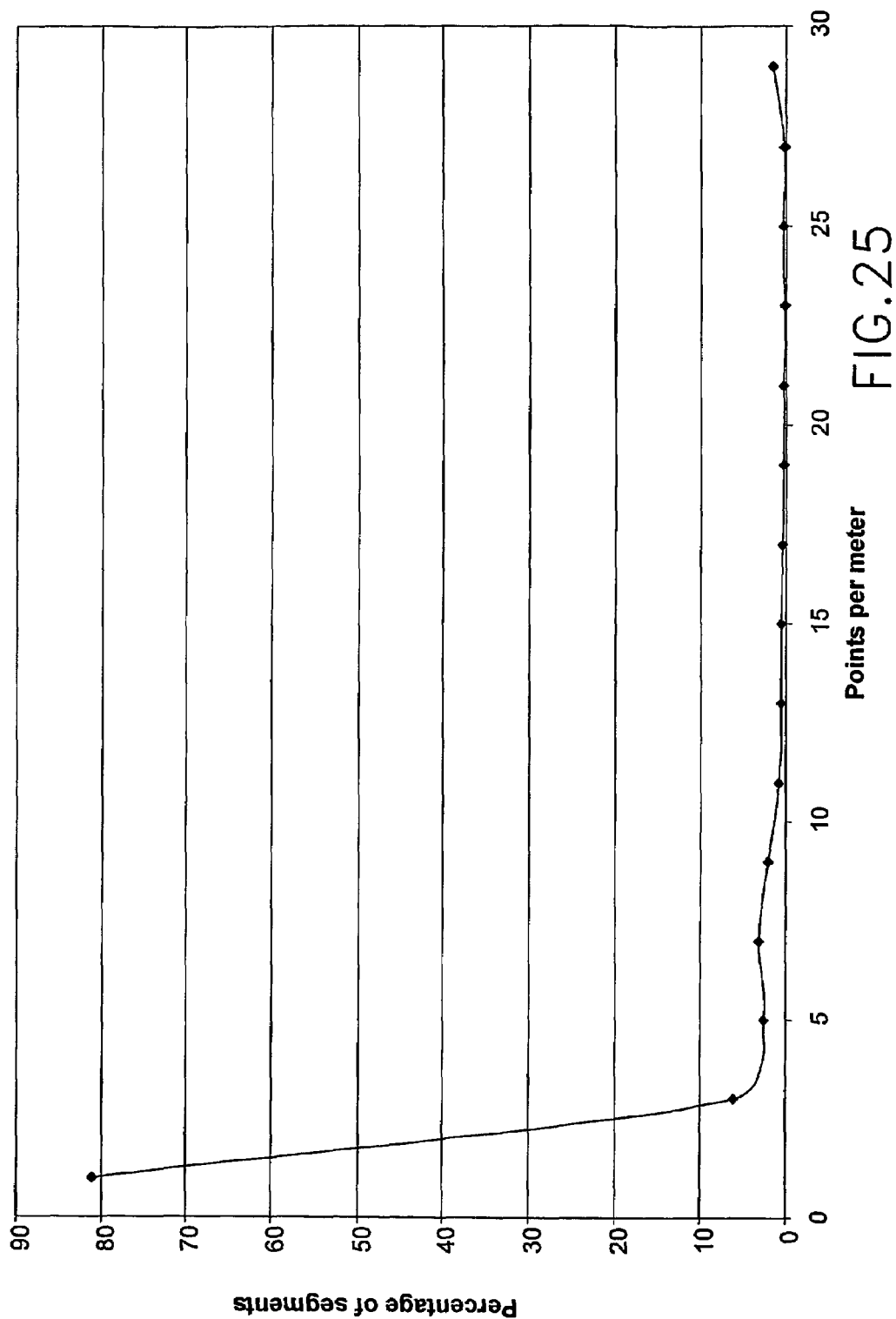
FIG. 25 shows point density distribution for road segments.

Segment Centerlines. The next step in processing involves creating a new, more accurate, road centerline than the one in the commercial base map. Such centerline need not be the geometrical center of the road; rather, the centerline only needs to be parallel to the lanes for later processing. The centerline is generated by fitting a spline curve to the GPS points on the segment. The centerline fit normally functions well, but the endpoints of the segment need to be constrained to be continuous with the adjoining segments. The plot in FIG. 25 illustrates the distribution of number of GPS points per meter. Many segments are not very well covered, with only 0.15 data points per meter, or 6.66 meters between points.

Figure 26:
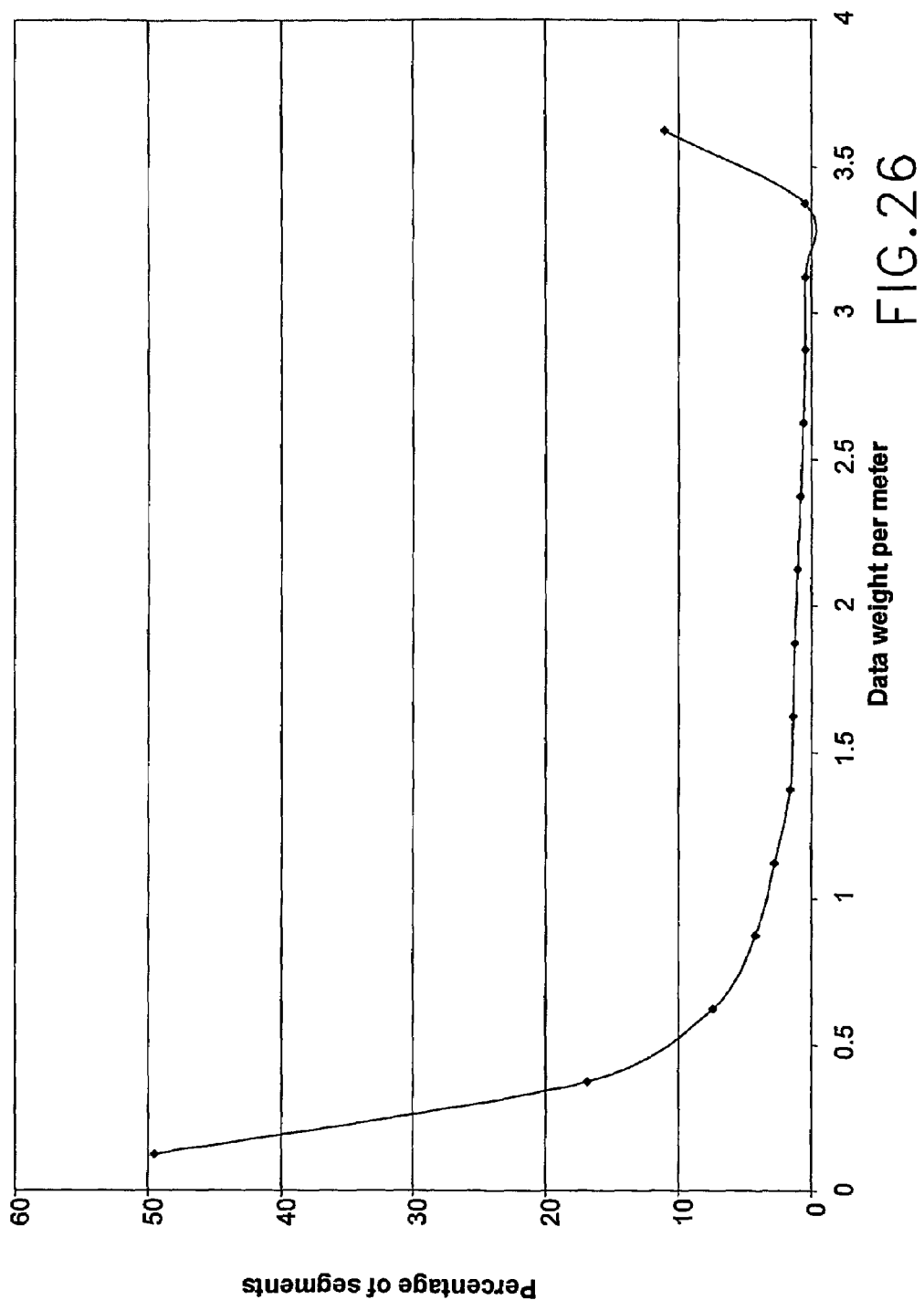
FIG. 26 shows a data weight distribution for road segments.

The higher the point density is, the higher the expected map accuracy. However, some GPS points are more accurate than others. The spline fitting algorithm weights points by their inverse horizontal dilution of precision. FIG. 26 shows the distribution of total weight per meter. Only 10% of the segments have a weight of more than 3.5. Applicants estimate that this weight is the minimum for highly accurate maps.

To characterize the accuracy of points on the map a bootstrap technique is used, as described previously.

Figure 27:
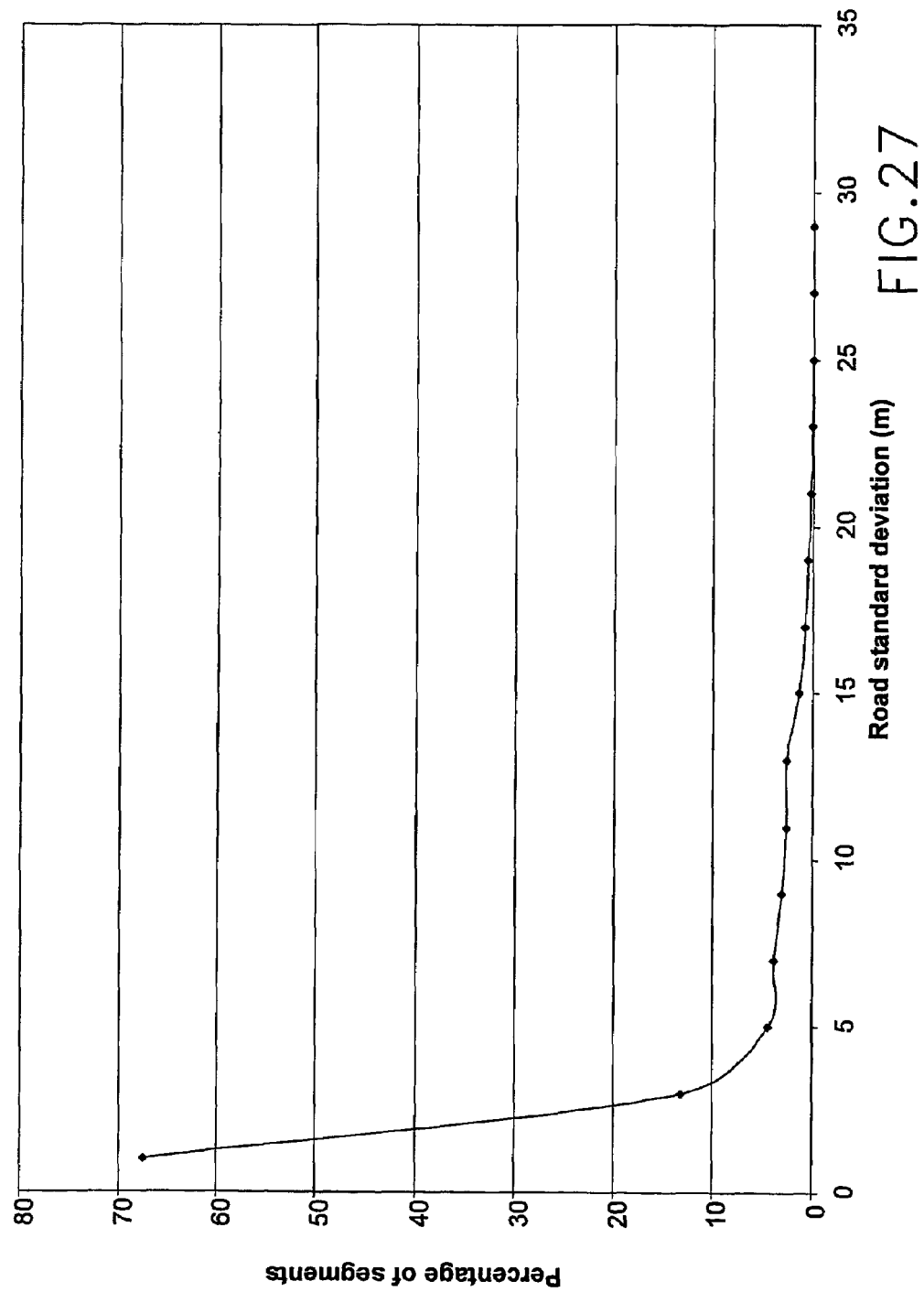
FIG. 27 shows the distribution of road widths.

It is impossible to determine directly the width of the road, but it can be assumed that the distribution of the offset of vehicles from the road centerline should tail off at about +/−8 meters for a 4-lane highway (of course, the truck fleet may not sample all the lanes, making some of them essentially invisible), and the standard deviation of the offsets should be about 4 meters. The distribution of actual standard deviations is shown in FIG. 27. Much of the data is within one meter of the road centerline, indicating that only one lane has been sampled.

Figure 28:
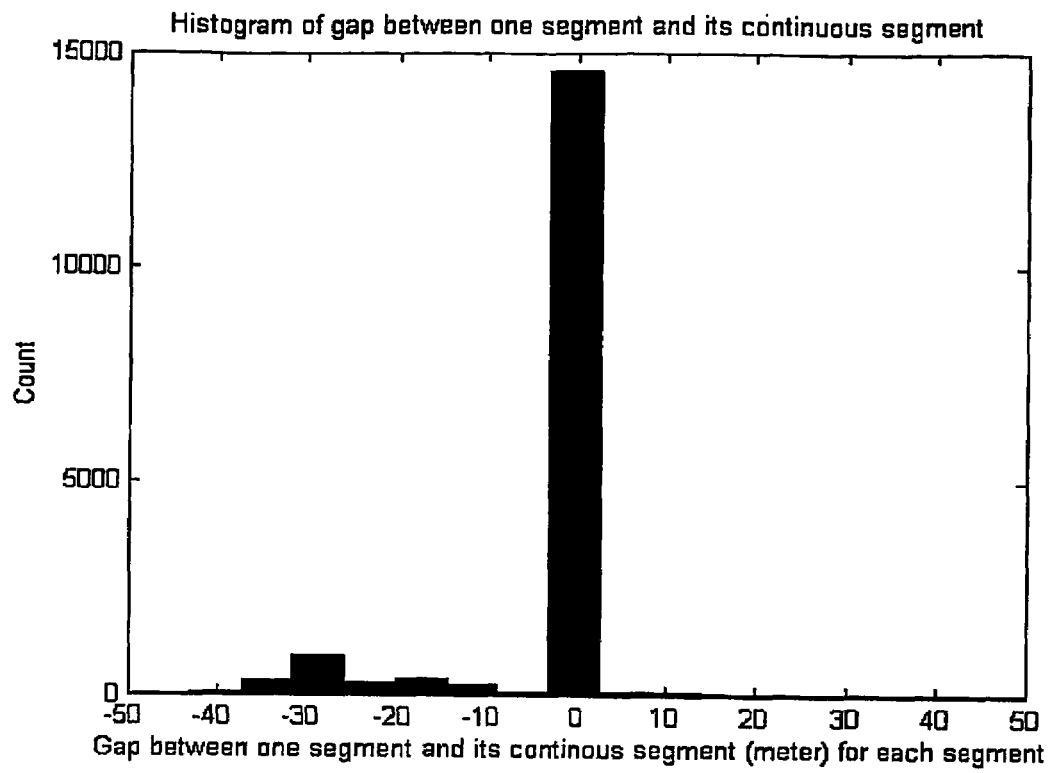
FIG. 28 shows the incidence of longitudinal gaps.
Figure 29:
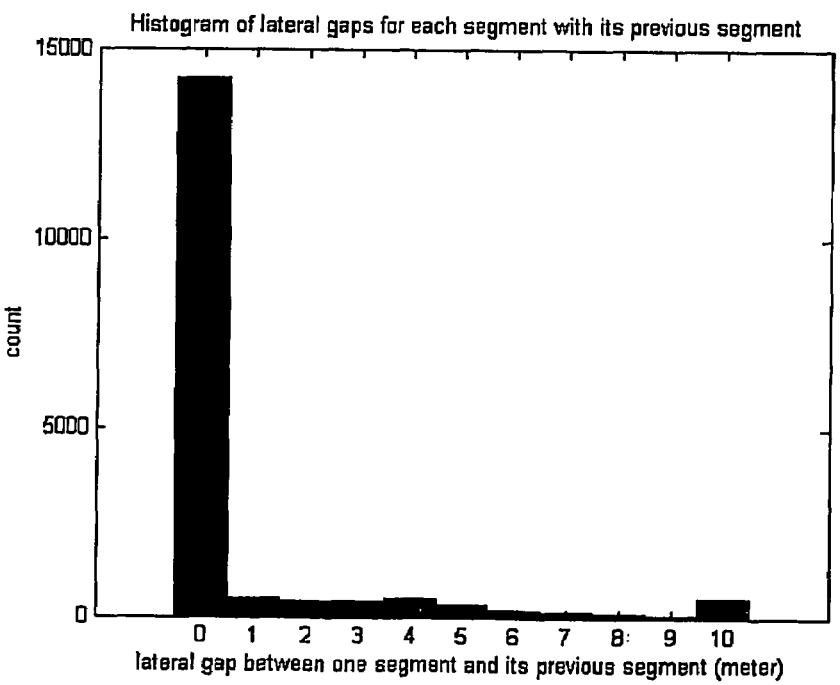
FIG. 29 shows the incidence of lateral gaps.

Since each segment centerline is computed independently of its neighbors, the endpoints are constrained to match one of the connecting segments (matching all of the connecting segments would force a distortion in the shape). About 60% of segments align perfectly with their neighbors, but there are instances of segment overlap or gaps between some segments. FIG. 28 shows the distribution of longitudinal gaps between neighboring segments, which is generally small; but there are a few large overlaps. FIG. 29 shows the distribution of lateral gaps (misalignments) between segments. Again, the gap is generally zero, but there are a few exceptions.

Figure 30:
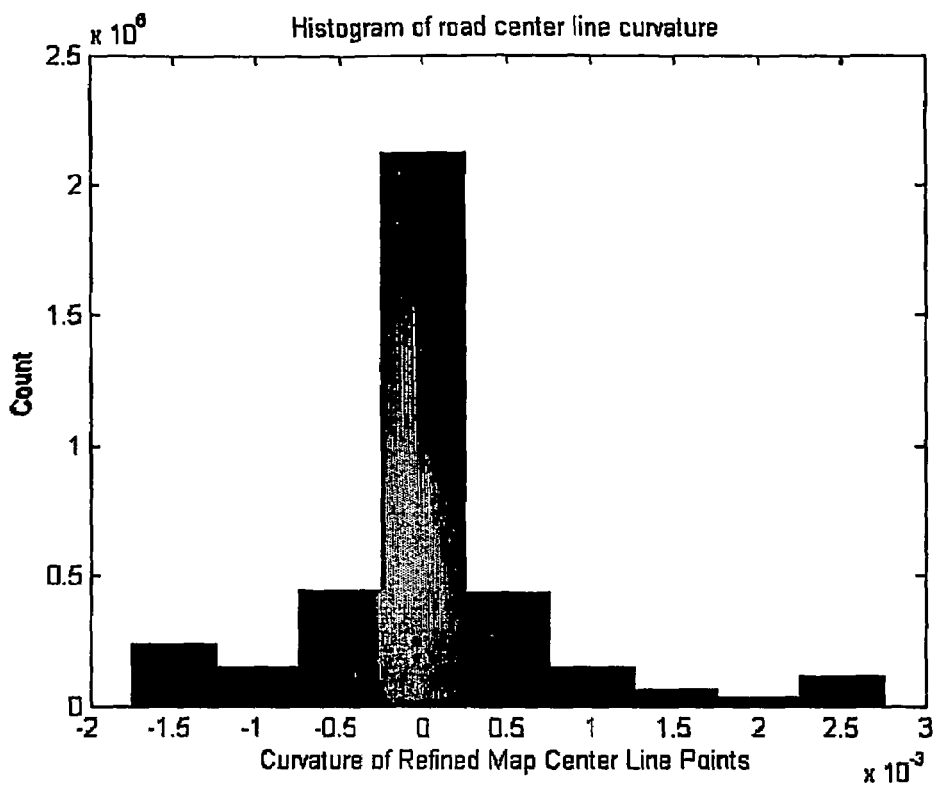
FIG. 30 is a histogram of road curvature.

Sections of road with high curvature are most dangerous for truck rollovers. The curvature of the spline at a particular point is a function of the derivatives of the spline. Its geometrical interpretation is that, for a point with curvature κ, the curve follows a circle with radius 1/κ at that point. For highways, curvature of more than 0.001 for right turns and −0.001 for left turns is dangerous. FIG. 30 shows that most roads in the data set are straight, while about 20% have a high left or right curvature.

Lanes. As the eventual aim is to find the exact curvature of the truck's current lane, the next step is to find the lane centerlines, informally defined as the invisible line which drivers in a lane are trying to follow. If the road centerline is parallel to all the lane centerlines, the lane centerlines are a constant offset from the road centerline. If drivers are following a particular lane most of the time, most of the data points should cluster into these lane offsets. Applicants have implemented a clustering technique to find the centers of these high-density regions that define the lane. To allow for lane merges and splits within the lane, each segment is divided into windows, and it is assumed that the lane structure is constant within each window.

Figure 31:
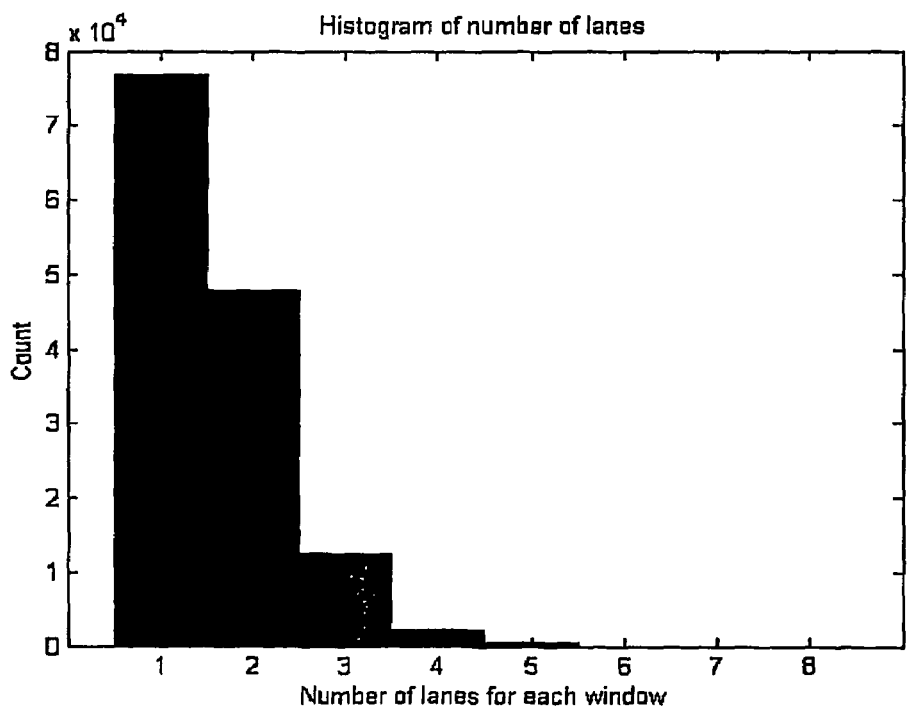
FIG. 31 shows the distribution of roads by number of lanes.

From the road width data in FIG. 27, it would be expected that most segments have only one lane. FIG. 31 displays the distribution of the number of lanes detected in each window. Although it is not as predominately single-lane as hypothesized, all segments seem to have a reasonable number of lanes. However, segments rarely change lane structure more than once or twice in the real world.

Figure 32:
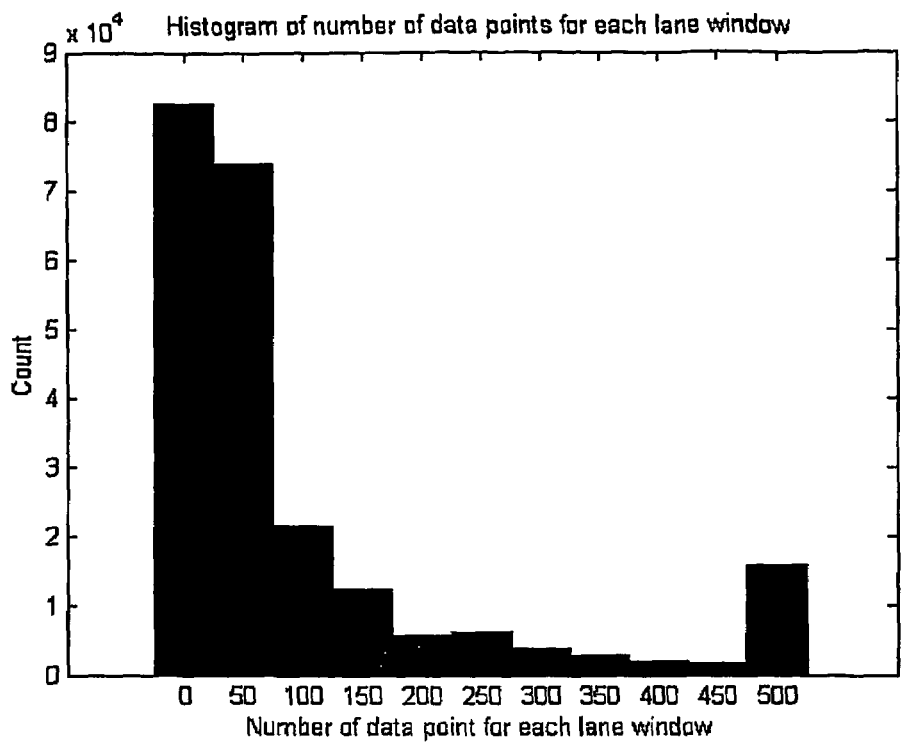
FIG. 32 shows the number of points in each lane, in each window.

As illustrated in FIG. 32, further investigation into the number of points in each lane window shows that almost 30% of lane windows have less than 20 points. Since the lane finding algorithm discards lanes with too few representative points, this is likely the cause of rapid structure changes in some segments. This problem can be remedied by "borrowing" evidence for a lane from neighboring windows, instead of processing each window in isolation.

Figure 33:
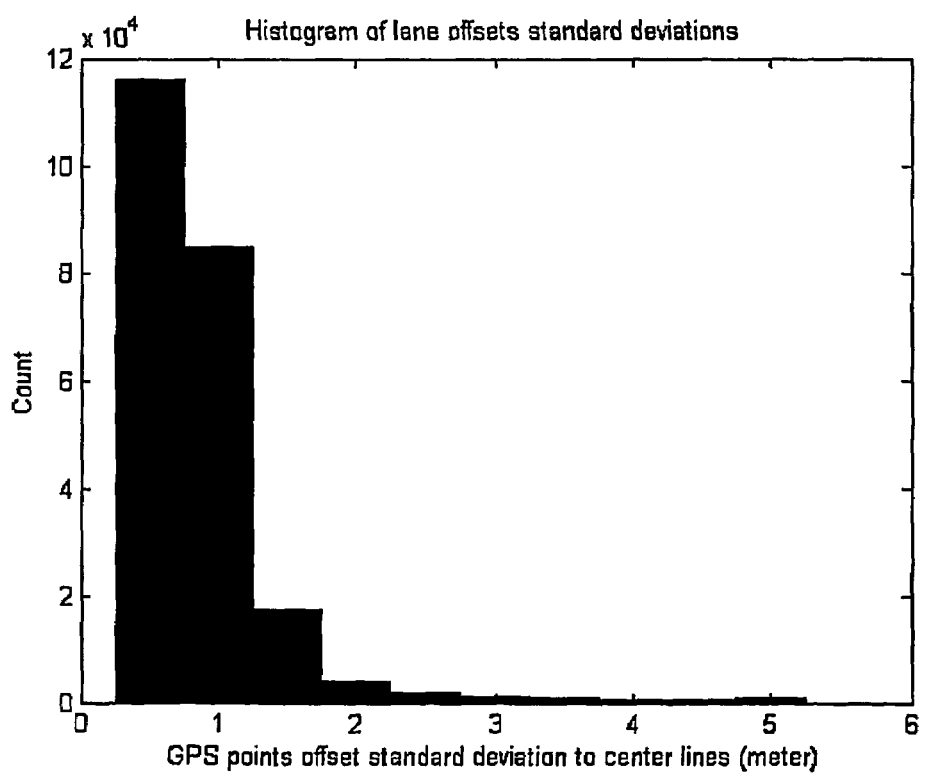
FIG. 33 shows a standard deviation of offsets of points in a lane from the centerline.
Figure 34:
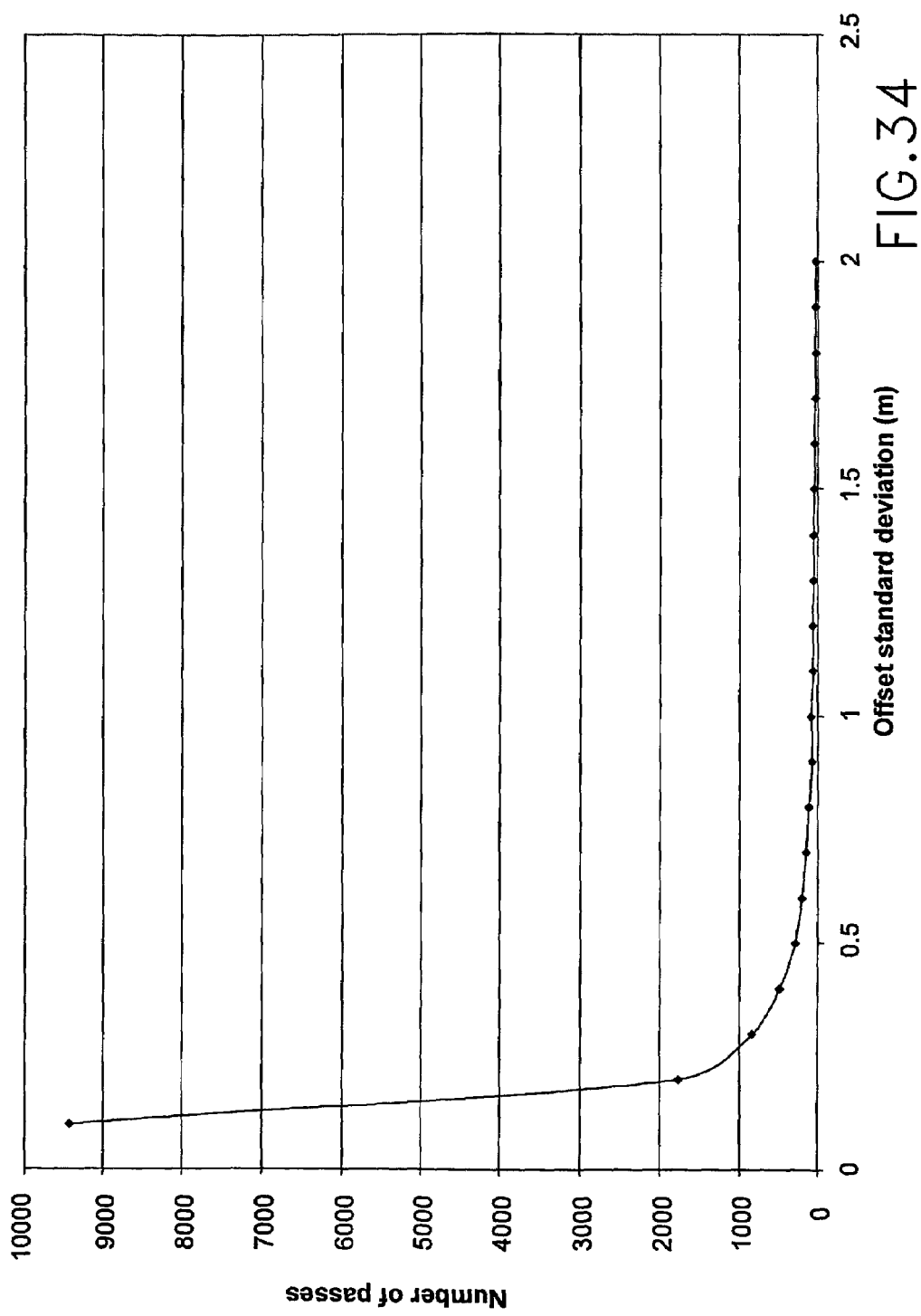
FIG. 34 shows a standard deviation of offsets for each pass.

Depending on i) the accuracy of the lane, ii) the GPS and iii) the driver's lane-following accuracy, the standard deviation of the distance to the lane center should be less than 1 meter. According to FIG. 33, the standard deviation peaks at about 1.4 meters, probably due to GPS noise. However, there are some outliers up to 36 meters from the lane centerline. It is interesting to contrast the overall standard deviation with the standard deviation for each pass. Since GPS error varies slowly, each pass should be fairly internally consistent: the standard deviation of the offsets should be lower. In fact, if the trace is traveling parallel to the lane/road centerline, the standard deviation should be 0. FIG. 34 indicates that this is the case, namely that most passes are traveling parallel to the centerline, and the overall standard deviation comes from differences amongst the traces.

Figure 35:
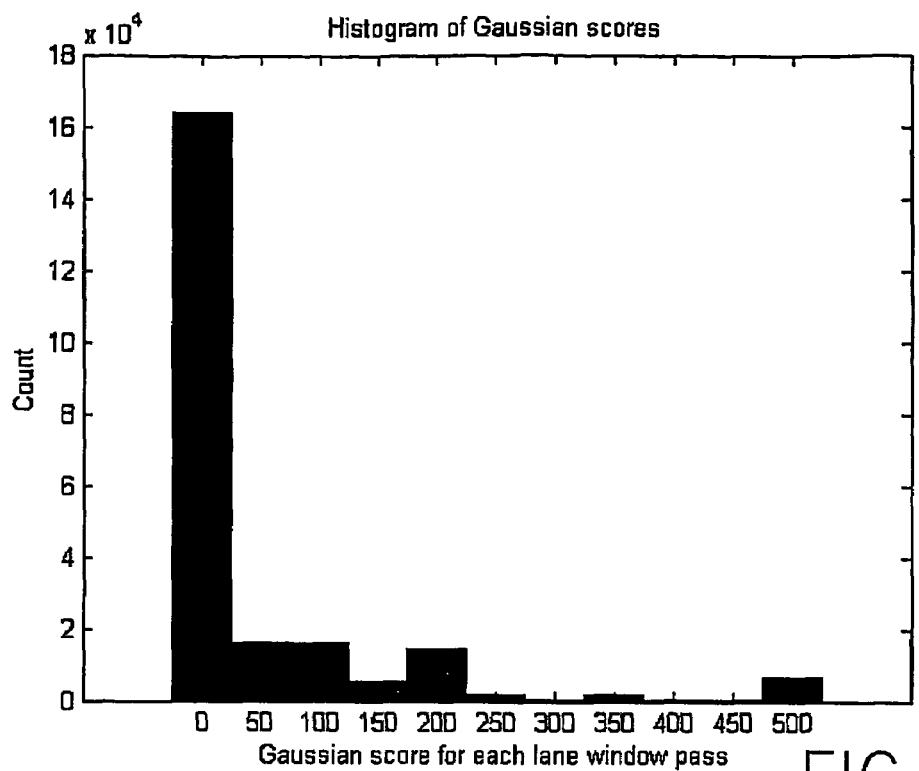
FIG. 35 shows a Gaussian deviation score distribution.
Figure 36:
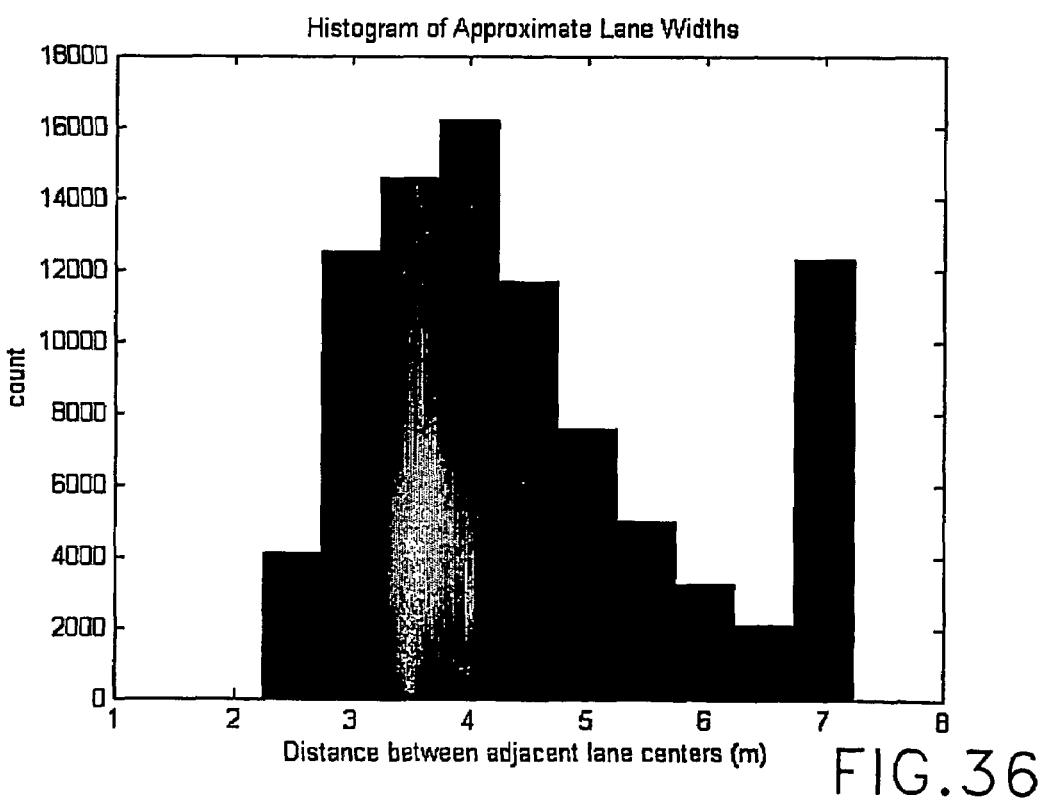
FIG. 36 shows a lane width distribution.

If the error sources fit a normal distribution, the total offset from the lane centerline should be a gaussian. FIG. 35 shows that many of the lane windows have a good Gaussian fit (low gaussian deviation). Finally, lane width is a good reality check for the lanefinder. Most lanes would be expected to be 3-4 meters wide, but surprisingly FIG. 36 shows that over 15% of the lane windows are 5 meters wide or more.

Analysis of Hotspots. The largest cluster of RSA warnings occurs at Hotspot 1, a highway onramp depicted in FIG. 2, that makes a 270 degree turn from a state highway to an interstate. Many trucks take the final portion of the curve too quickly as they accelerate in preparation for merging onto the highway. In FIG. 2, centerline was calculated by fitting a spline to the position data, roughly 226 passes with a total of 19,000 points. Since the segment is roughly 600 meters long, the data density is 32 points per meter, one of the highest in the data set.

Figure 37:
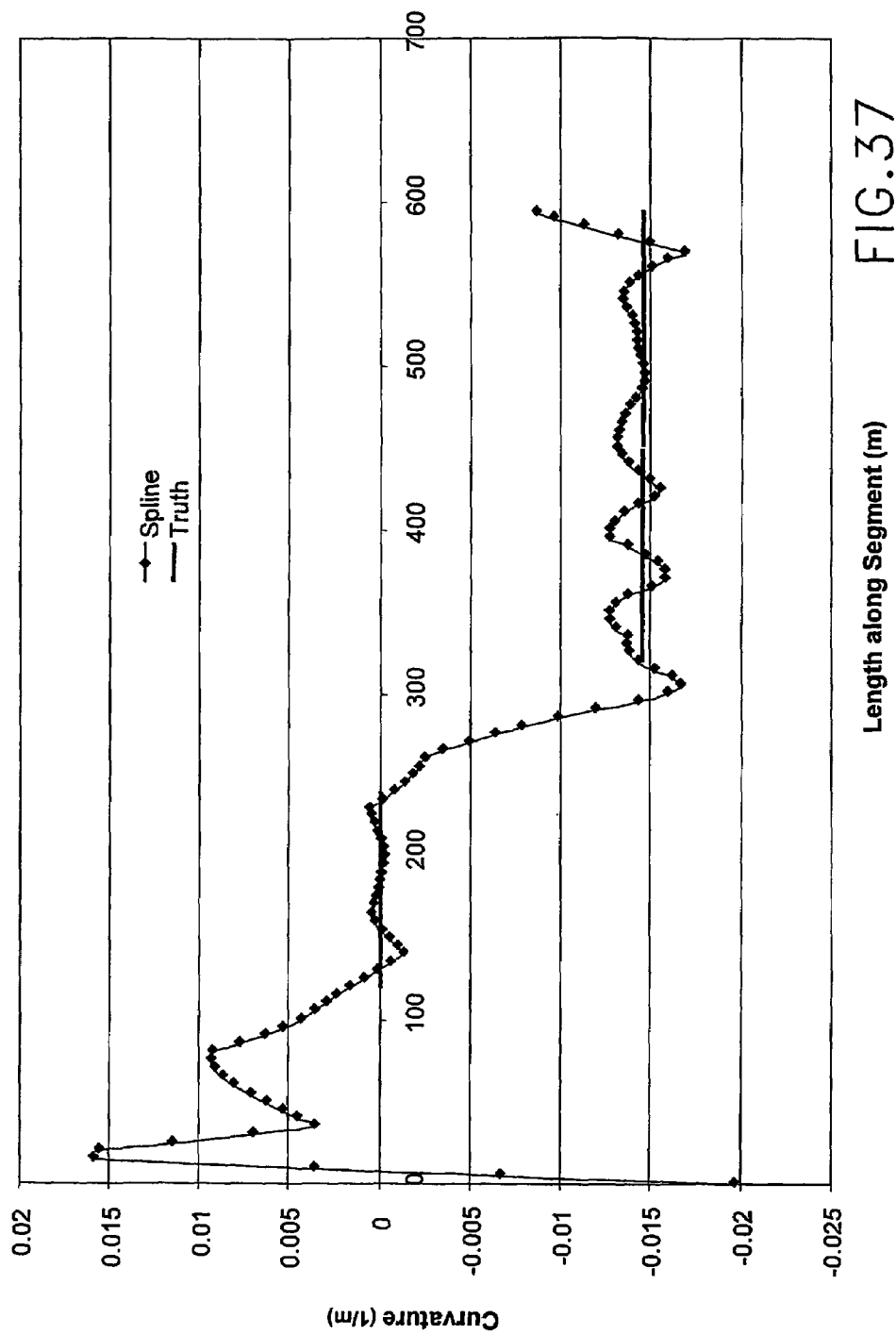
FIG. 37 shows curvature data as a function of distance for hotspot 1.
Figure 38:
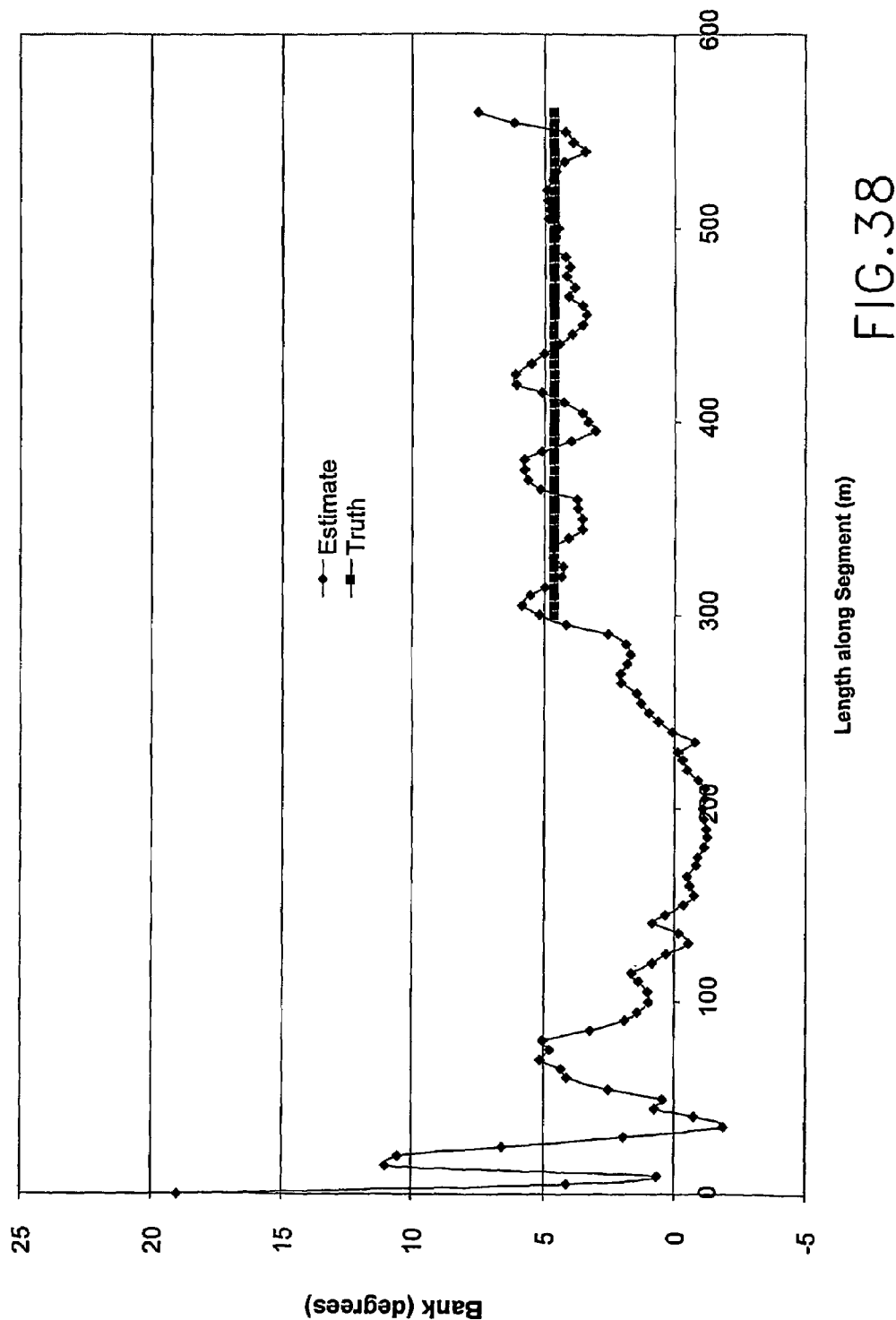
FIG. 38 shows road bank angle data as a function of distance for hotspot 1.

As noted previously, the major factors impacting the rollover score are road geometry, driver behavior, and truck parameters. Road geometry parameters include road curvature and superelevation. Curvature can be calculated from the derivatives of the road centerline spline. FIG. 37 shows the curvature along this hotspot, with an estimate of the true curvature according to government highway data. The curvature is mostly accurate, with the exception of some problems near the beginning due to poor positioning data. The superelevation, or bank, of the curve lets the truck drive faster around the curve without increasing its lateral acceleration. The superelevation can be calculated from the measured lateral acceleration, speed, and curvature, $$E = v^2 \kappa/g - f,$$ (Eq. 12)

where v is velocity in m/s, $\kappa$ is curvature in $m^{-1}$, g is 9.81 $m/s^2$, and f is the lateral acceleration in g. FIG. 38 shows the bank angle (in degrees) along the curve, with an estimate of the true bank angle according to the Indiana Department of Transportation.

Figure 39:
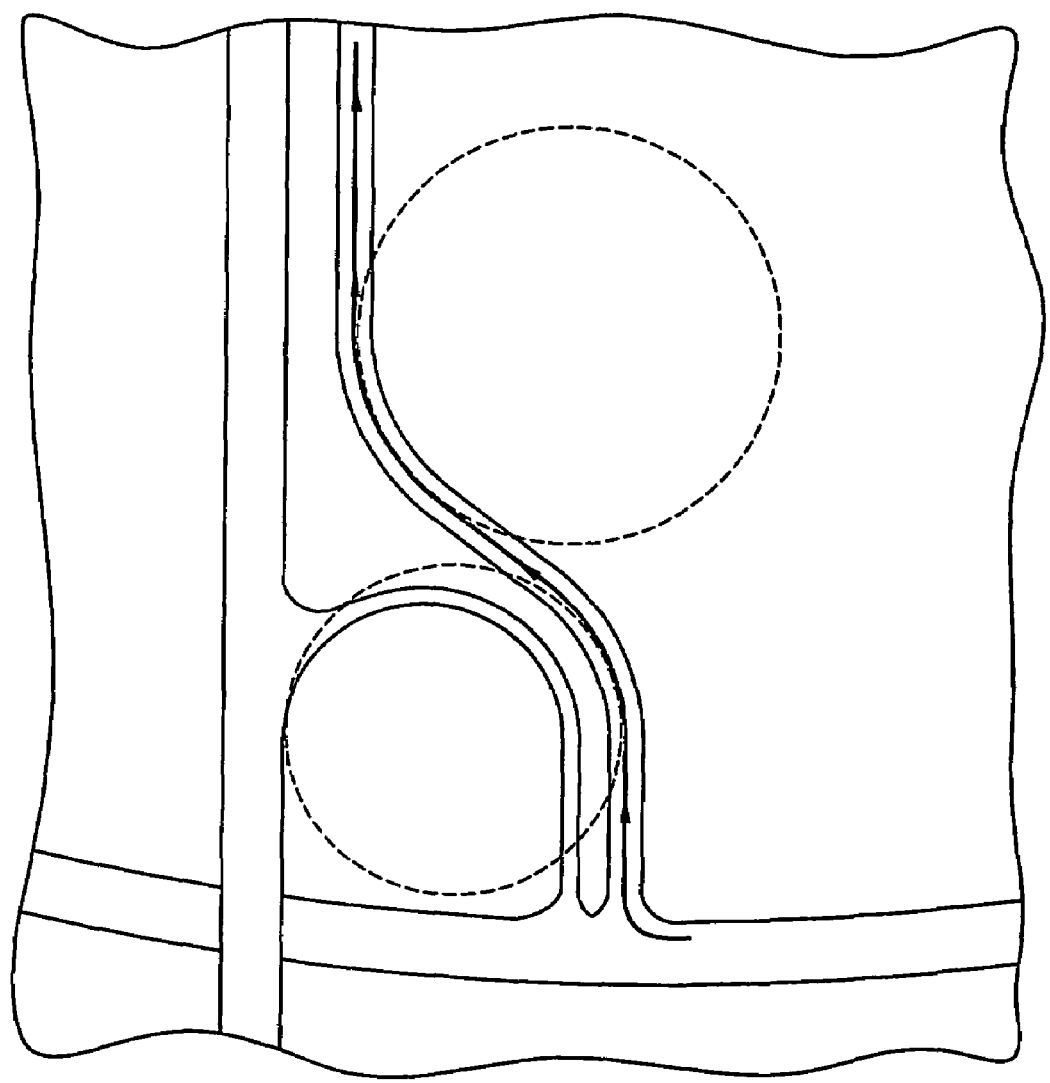
FIG. 39 is a diagrammatic illustration of hotspot 2.
Figure 40:
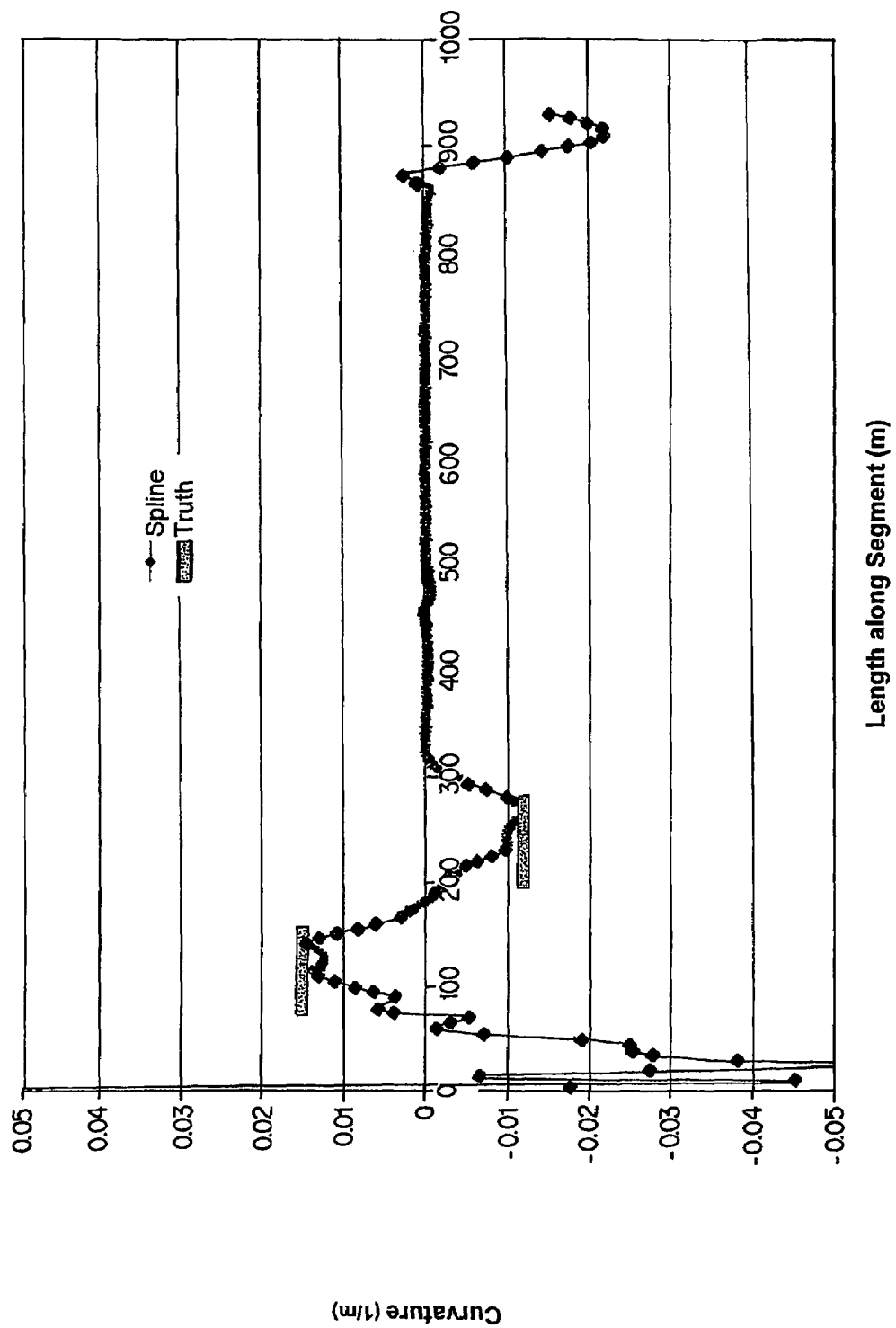
FIG. 40 shows curvature data as a function of distance for hotspot 2.
Figure 41:
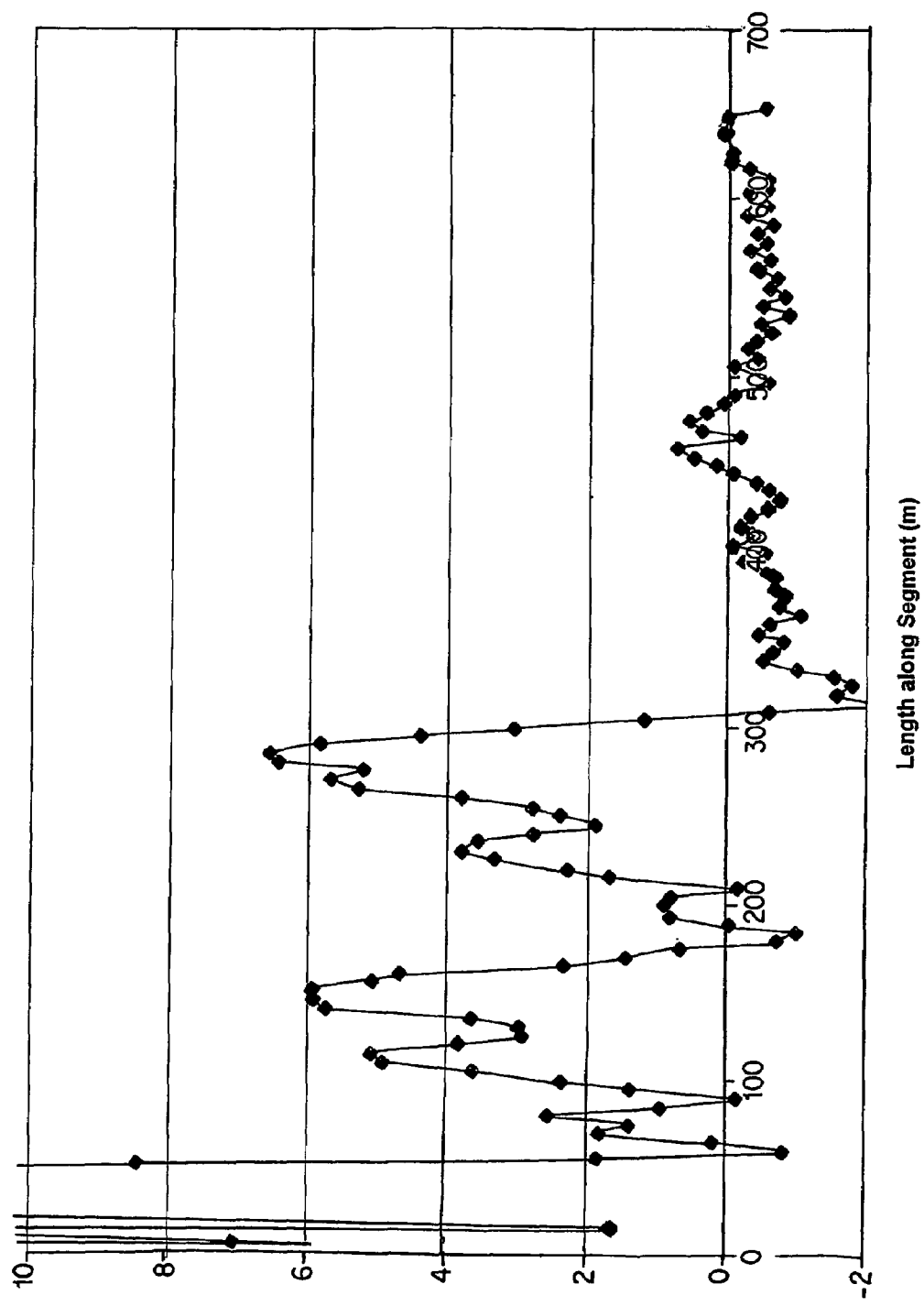
FIG. 41 shows road bank angle data as a function of distance for hotspot 2.

Hotspot 2, the second-largest site of RSA warnings occurs on an S-curve as depicted in FIG. 39, including the computed centerline and circles for the two curves. This segment, which had 151 passes and about 34,000 points, is somewhat longer than hotspot 1 (about 930 m in length), giving an average of 36 points per meter. As in hotspot 1, FIGS. 40 and 41 show the curvature and bank angle, respectively. The results are good in the interior of the segment, but the endpoints are noisy because of low data density and distinct populations of traces entering and leaving the segment from different segments.

The accuracy of the centerline for these hotspots can be estimated using the bootstrapping procedure, which is a computer-based method for assigning measures of accuracy to statistical estimates. It is particularly useful where standard statistical theory is useless because the situation is too complicated to be mathematically tractable or too ill understood to make justifiable assumptions about the nature of the stochastic phenomenon to arrive at a reasonable model.

The latter is the case in the present situation, since the random nature of the sources of GPS and driving errors is not well understood, and it seems incorrect to make simplifying assumptions such as "error in each GPS point is an independent Gaussian random variable with zero mean". It is best then to use a non-parametric statistical technique to attach a measure of accuracy to the map points. Bootstrap is the one used because of its simplicity, its universal applicability, and its reliable behavior in situations where its results can be compared with those from standard techniques.

The idea behind bootstrap is simple: in the absence of any assumptions, all that can be known about the distribution of the population is present in the distribution of the data itself. So the "empirical distribution" is taken in place of the original distribution (whatever it might be), and the usual statistical procedure is applied, i.e., sample the data with replacement to create new data sets, compute the desired statistic for each of these, and look at the distribution of the statistic and compute its desired moments.

In the present case, the statistic of interest is the fitted spline. So, the original data set of GPS points (call it x) can be used to create data sets $x^1, x^2, \ldots, x^b$ by randomly choosing data points with replacement from x. Each new data set is of the same size as the original. Splines are fit to each of $x^1$, $x^2, \ldots, x^b$. The collection of these splines reflects the distribution of the "spline" statistic. It is now possible to calculate any measure of accuracy we choose for this statistic. We choose to take points on the splines at regular intervals and calculate the standard errors of these points. For example we take the points on all splines at parameter value 0.5; these are the mid-points of the splines (according to arc-length). We calculate the standard error of these points from the standard formula for standard error. Bootstrap theory guarantees that this standard error is close to the actual standard deviation of the spline mid-points, and gets closer as the number of bootstrap samples, b, is increased.

Table 1 shows the map accuracy for Hotspots 1 and 2 using the bootstrap method, with the number of samples b set to 200:

TABLE 1

| Map accuracy, in meters, for different areas and data volumes. | | |
|---|---|---|
| | 10 traces | 200 traces |
| Hotspot 1 | 0.041 m | 0.011 m |
| Hotspot 2 | 0.219 m | 0.015 m |

Bootstrapping was not performed on the entire database because of its computational complexity. In addition to calculating the accuracy for the all traces, the accuracy was also evaluated with a partial data set of only 10 traces to see how much accuracy is gained with more data. To arrive at a single number for each condition, the standard distribution of the error distribution was calculated for all points along the centerline, and the mean was taken. Both hotspots are very accurate with complete data, but Hotspot 2 is significantly lower quality with only 10 traces. The 10 traces for Hotspot 2 are probably low-quality, illustrating that making maps from higher volumes of data reduces uncertainty over the final map quality, as well as improving the overall map quality.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

The invention claimed is:

1. A method for preventing vehicle rollover for a vehicle traveling on a road, said method comprising:

for each present position of said vehicle as said vehicle travels on said road, forecasting future speed of said vehicle as a function of future position of said vehicle on said road, for a plurality of points that are distributed throughout a segment of said road forward of said vehicle, based on an assumption regarding a driving behavior of an operator of said vehicle relative to statistical speed data for vehicles traveling said road, and based on road geometry data contained in a map;

at each said present position of said vehicle, determining a maximum safe speed of said vehicle for each of said plurality of points in said road segment forward of said vehicle, based on a maximum lateral acceleration, on said road geometry and on physical parameters of said vehicle; and generating a rollover warning for any current position of said vehicle on said road at which the forecast future speed for at least one particular point on said road segment forward of said vehicle exceeds the determined maximum safe speed at said at least one particular point.

2. The method according to claim 1, wherein said maximum safe speed is a speed beyond which, based on said road geometry and on said parameters of said vehicle, it is unavoidable that the vehicle will subsequently encounter a lateral acceleration that will cause it to roll over.

3. The method according to claim 2, wherein said maximum safe speed is determined based on curvature of said road at each of said points on said road forward of said present position.

4. The method according to claim 2, wherein said maximum safe speed is determined by a cost function that takes into account at least longitudinal speed and lateral acceleration of said vehicle.

5. The method according to claim 4, wherein said cost function further takes into account fuel consumption of said vehicle.

6. The method according to claim 1, wherein said vehicle speed is forecasted based on a model of driving behavior derived from data contained in said map data.

7. The method according to claim 6, wherein the future vehicle speed is forecasted based on an assumption that the driver of the vehicle will maintain the speed of the vehicle at the same percentile position relative to said statistical speed data, throughout the road segment forward of said vehicle.

8. The method according to claim 1, wherein when, at a first point in time, said forecasted future speed of said vehicle at a particular location on said road segment forward of said vehicle exceeds the maximum safe speed determined for that particular location, remedial action is taken at a second point in time which is subsequent to said first point in time, and is determined as a function of at least one of driver reaction time, maximum vehicle deceleration, a minimum time to achieve said maximum vehicle deceleration and a speed cushion.

9. The method according to claim 8, wherein:
said remedial action comprises a warning to said driver; and
said warning is given at a point in time such that, after the reaction time, the maximum deceleration will bring the vehicle to the speed cushion below the maximum safe speed at a time t corresponding to particular point.

10. The method according to claim 8, wherein said remedial action includes an automatic slowing of the vehicle.

11. The method according to claim 1, wherein said statistical speed data contained in said map comprises speed data collected from actual truck operations over roads contained in said map, using GPS data to determine points along said road.

12. The method according to claim 11, wherein said map includes data characterizing at least one of vehicle position GPS, GPS error estimates, vehicle speed, measured lateral acceleration, vehicle operating parameters and lane-tracker information.

13. The method according to claim 12 wherein:
GPS points are map matched with a commercially available digital map;
a GPS trace is broken into map segments based on said map;
all GPS traces on each segment are collected;
B-splines are fit to said traces to determine a centerline of the road;
curvature along each segment is determined based on a derivative of said splines.

14. The method according to claim 1, wherein said future speed of said vehicle and said maximum safe speed are dynamically computed at each present position of said vehicle as it moves over said road, based at least on road geometry for said road forward of said particular position.

15. A method for preventing vehicle rollover for a particular vehicle traveling on a road, said method comprising:
compiling a map database containing road geometry data for at least a road segment of said road;
operating vehicles over said road segment and receiving their speed data as a function of position along said road segment, said speed data being stored in said map database;
determining a maximum safe speed for the particular vehicle for a plurality of points that are distributed along said road segment;
projecting speed of the particular vehicle as a function of position within said road segment, based on an assumption regarding relative driving speed behavior of an operator of the particular vehicle compared to said statistical speed data for said road segment, as stored in said map; and
generating a warning for any point in time at which the projected future speed of the particular vehicle exceeds said maximum safe speed at any point within said road segment.

16. The method according to claim 15, further comprising:
determining a continuous safe speed curve based on optimal control parameters for the particular vehicle as determined by a cost function that penalizes at least high lateral accelerations; and
generating said warning for any present point in time for which projected future speed of the particular vehicle exceeds said continuous safe speed curve at any future position of the particular vehicle along said road segment.

* * * * *